(12) United States Patent
Fujimoto et al.

(10) Patent No.: US 6,448,995 B1
(45) Date of Patent: Sep. 10, 2002

(54) IMAGE READ/WRITE HEAD, AND IMAGE PROCESSING APPARATUS INCORPORATING THE SAME

(75) Inventors: Hisayoshi Fujimoto; Hiroaki Onishi; Toshihiko Takakura; Norihiro Imamura, all of Kyoto (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 09/701,290

(22) PCT Filed: May 31, 1999

(86) PCT No.: PCT/JP99/02874

§ 371 (c)(1),
(2), (4) Date: Nov. 28, 2000

(87) PCT Pub. No.: WO99/63748

PCT Pub. Date: Dec. 9, 1999

(30) Foreign Application Priority Data

| May 29, 1998 | (JP) | ............................................ 10-149583 |
| Jul. 13, 1998 | (JP) | ............................................ 10-197334 |
| Jul. 13, 1998 | (JP) | ............................................ 10-197335 |
| Jul. 21, 1998 | (JP) | ............................................ 10-204916 |

(51) Int. Cl.[7] .................. B41J 15/14; G03G 15/22; H04N 1/024
(52) U.S. Cl. .................. 347/241; 399/144; 358/472
(58) Field of Search ..................... 347/171, 209, 347/197, 241, 256; 358/401, 448, 472, 471, 482, 296, 493; 399/144

(56) References Cited

U.S. PATENT DOCUMENTS 4,347,533 A * 8/1982 Ogawa ..................... 358/296
5,570,122 A * 10/1996 Inamura et al. ............. 347/171
5,579,114 A * 11/1996 Inamura ..................... 358/482
6,014,231 A * 1/2000 Sawase et al. .............. 358/482

FOREIGN PATENT DOCUMENTS

| JP | 60-126961 | 7/1985 | .......... H04N/1/024 |
| JP | 2-36258 | 3/1990 | .......... H04N/1/024 |
| JP | 2-57661 | 4/1990 | .......... H04N/1/024 |
| JP | 6-70090 | 3/1994 | .......... H04N/1/024 |
| JP | 6-86004 | 3/1994 | .......... H04N/1/024 |
| JP | 6-113069 | 4/1994 | .......... H04N/1/024 |
| JP | 6-319013 | 11/1994 | .......... H04N/1/024 |
| JP | 8-191371 A | * 7/1996 | ............ H04N/1/28 |

* cited by examiner

*Primary Examiner*—Hai Pham
(74) *Attorney, Agent, or Firm*—Michael D. Bednarek; Shaw Pittman LLP

(57) ABSTRACT

An image read/write head (A) includes: a substrate (4) having a first widthwise side portion (4c), a second widthwise side portion (4d), and an upper surface carrying a row of light-receiving elements (2) longitudinally of the substrate; an elongate case (1) mounted to the upper surface of the substrate (4) to enclose the light-receiving elements (2); a transparent cover (19) mounted to an upper surface of the case (1) for contact with a document to be fed; a light source (3) disposed in the case for illuminating the document; a lens (5) disposed in the case for causing an image of the document (D) illuminated by the light source (3) to be formed on the light-receiving elements (2); and a row of printing elements (8) carried by the an upper surface of the substrate at an excess portion which is provided by extending the first side portion (4c) beyond a lower edge of the case (1) by a predetermined amount. The transparent cover (19) is inclined such that the cover (19) becomes progressively farther from the substrate as it extends toward the first side portion (4c) of the substrate (4).

22 Claims, 19 Drawing Sheets

IMAGE READ/WRITE HEAD, AND IMAGE PROCESSING APPARATUS INCORPORATING THE SAME

TECHNICAL FIELD

The present invention relates to an image read/write head having both an image-reading function and an image-forming function, and to an image processing apparatus incorporating the same.

BACKGROUND ART

Image processing apparatuses, such as a facsimile apparatus, need to have both an image-reading function and an image-forming function. Further, there exists a demand to be met for the downsizing of such image processing apparatuses. Accordingly, image read/write heads have been proposed which are capable of reading images as well as forming images. One such image read/write head is of the construction shown in FIG. 19. Image read/write head H shown includes a case 1e having an upper portion defining an opening fitted with a transparent cover 19e. In the case 1e is disposed a light source 3e for illuminating a reading line Se established on the transparent cover 19e. The case 1e is further fitted at the bottom thereof with an elongate substrate 4e having upper and lower surfaces 40 and 41 carrying a row of light-receiving elements 2e and a row of heat-generating elements 8e, respectively, longitudinally of the substrate 4e.

With the image read/write head H thus constructed, a document D to be read is fed while intimately contacting the transparent cover 19e by rotation of a platen roller P1 for feeding documents. In this process the document D is illuminated by light from the light source 3e. The light reflected by the document D is gathered by a lens 5e disposed between the reading line 5e and the light-receiving elements 2e, so that the image of the document D is formed on the row of the light-receiving elements 2e. In this way, the image data of the document D is obtained. On the other hand, recording paper K is fed while intimately contacting the heat-generating elements 8e by rotation of a platen roller P2 for feeding recording paper. In this process the image of the document D is formed on the recording paper K by causing appropriate ones of the heat-generating elements 8e, which are selected according to the image data of the document, to generate heat.

As described above, the image read/write head H is constructed such that the document D is fed while intimately contacting the transparent cover 19e fitted in the opening defined in the upper portion of the case 1e, whereas the recording paper K is fed while intimately contacting the heat-generating elements 8e mounted on the lower surface 41 of the substrate 4e. Stated otherwise, the platen roller P1 for feeding documents is positioned above the image read/write head H, while, on the other hand, the platen roller P2 for feeding recording paper is positioned below the image read/write head H. Such positioning of the platen rollers P1 and P2 makes it difficult to reduce the vertical dimension of an image processing apparatus incorporating the image read/write head H, hence, to downsize the whole apparatus.

It is, therefore, a main object of the present invention to provide an image read/write head which, when incorporated in an image processing apparatus, allows such an image processing apparatus to be remarkably downsized.

DISCLOSURE OF INVENTION

According to a first aspect of the present invention, there is provided an image read/write head comprising:

a substrate having a first widthwise side portion, a second widthwise side portion, and an upper surface carrying a row of light-receiving elements longitudinally of the substrate;

an elongate case mounted to the upper surface of the substrate to enclose the light-receiving elements;

a transparent cover mounted to an upper surface of the case for contact with a document to be fed;

a light source disposed in the case for illuminating the document;

a lens unit disposed in the case for causing an image of the document illuminated by the light source to be formed on the light-receiving elements; and a row of printing elements carried by the upper surface of the substrate at an excess portion which is provided by extending the first side portion beyond a lower edge of the case by a predetermined amount;

wherein the transparent cover is inclined such that the cover becomes progressively farther from the substrate as it extends toward the first side portion of the substrate.

In the above construction, the printing elements are, typically, heat-generating elements for recording an image on recording paper by thermal transfer printing or thermal recording. In constructing an image processing apparatus incorporating the image read/write head of the above construction, the platen roller for feeding the document for contact with the front surface of the transparent cover and the other platen roller for feeding the recording paper for contact with the printing elements are both positioned on the same side of the substrate, whereby the image processing apparatus can have a remarkably reduced thicknesswise dimension.

Further, since the transparent cover of the image read/write head is inclined in the manner described above, the platen roller for feeding the document and the platen roller for feeding the recording paper can be disposed with a positional relationship such as to have a reduced distance therebetween in a plane perpendicular to the major plane of the substrate with an adequate distance being secured between the two rollers in the major plane of the substrate. This arrangement enables further downsizing of the image processing apparatus in the thicknesswise dimension while allowing the respective feeding paths of the document and the recording paper to be set appropriately without any interference therebetween.

According to a second aspect of the present invention, there is provided an image read/write head comprising:

a substrate having a first widthwise side portion, a second widthwise side portion, and an upper surface carrying a row of light-receiving elements longitudinally of the substrate;

an elongate case mounted to the upper surface of the substrate to enclose the light-receiving elements;

a transparent cover mounted to an upper surface of the case for contact with a document to be fed;

a light source disposed in the case for illuminating the document;

a lens unit disposed in the case for causing an image of the document illuminated by the light source to be formed on the light-receiving elements; and a row of printing elements carried by the upper surface of the substrate at an excess portion which is provided by extending the first side portion beyond a lower edge of the case by a predetermined amount;

wherein the lens unit is inclined toward the second side portion.

Like the image read/write head according to the first aspect of the present invention, this image read/write head has the platen roller for feeding the document and the other platen roller for feeding the recording paper, both positioned on the same side of the substrate, whereby an image processing apparatus incorporating this image read/write head can have a reduced thicknesswise dimension.

Further, this image read/write head has the lens unit inclined toward the second side portion of the substrate. Since the lens unit is adapted to cause an image at an image-reading line defined on the transparent cover to be formed on the row of light-receiving elements, the above construction is meant to have the reading line on the transparent cover displaced relative to the light-receiving elements on the substrate toward the second side portion of the substrate. Since the platen roller for feeding the document is positioned to come into contact with the reading line, this construction also can secure an adequate distance between the platen roller for feeding the document and the platen roller for feeding the recording paper, thereby allowing the respective feeding paths of the document and the recording paper to be set appropriately without any interference therebetween. Further, this construction can secure a sufficient optical path length between the reading line and the light-receiving elements thereby increasing the focal depth of the lens. This leads to an improvement in the quality of an image thus read.

According to a third aspect of the present invention, there is provided an image read/write head comprising:

a substrate having a first widthwise side portion, a second widthwise side portion, and an upper surface carrying a row of light-receiving elements longitudinally of the substrate;

an elongate case mounted to the upper surface of the substrate to enclose the light-receiving elements;

a transparent cover mounted to an upper surface of the case for contact with a document to be fed;

a light source disposed in the case for illuminating the document;

a lens unit disposed in the case for causing an image of the document illuminated by the light source to be formed on the light-receiving elements; and a row of printing elements carried by the substrate at an excess portion which is provided by extending the first side portion beyond a lower edge of the case by a predetermined amount;

wherein the case has a lateral surface on a side closer to the first side portion of the substrate, the lateral surface being inclined toward the second side portion of the substrate.

Like the image read/write head according to the first aspect of the present invention, this image read/write head has the platen roller for feeding the document and the other platen roller for feeding the recording paper, both positioned on the same side of the substrate, whereby an image processing apparatus incorporating this image read/write head can have a reduced thicknesswise dimension.

Further, this construction also can secure an adequate distance between the platen roller for feeding the document and the platen roller for feeding the recording paper, thereby allowing the respective feeding paths of the document and the recording paper to be set appropriately without any interference therebetween.

In a preferred embodiment of the image read/write head according to any one of the foregoing aspects of the invention, the case and the substrate are assembled together by engagement means for bringing the substrate or a member integral with the substrate into engagement with the case. Such an arrangement improves the operability of assemblage of the case and the substrate together.

In a further preferred embodiment, the engagement means is configured to cause longitudinally opposite ends of the case to engage the substrate or a member superposed on the substrate. Such a configuration allows the longitudinally opposite ends, in particular, of the case to be secured to the substrate while stabilizing the assembly with the number of parts of the engagement means reduced.

In a further preferred embodiment, the engagement means is configured to cause a portion of the case adjacent the printing elements transversely of the case to engage the substrate or the member superposed on the substrate. Such a configuration is capable of preventing the case and the substrate from defining a clearance therebetween at that portion of the case adjacent the printing elements, thereby avoiding the occurrence of a feeding failure such as catching of the recording paper by the clearance which would otherwise be defined between the case and the substrate.

In a further preferred embodiment, the case has a bottom surface facing the substrate, the bottom surface having a longitudinally central portion bulging relative to longitudinally opposite ends of the case when the case is in a natural state. Such a configuration is capable of appropriately preventing the central portion of the case from being raised relative to the substrate when the case is engaged at the opposite ends thereof with the substrate or a heat sink plate, thereby avoiding the occurrence of a feeding failure such as entry of the recording paper into the clearance which would otherwise be defined between the case and the substrate.

A preferred embodiment of the image read/write head according to the first or second aspect of the invention further comprises a single or plural guide means provided integrally with or separately from the case, the substrate or a member integral therewith for guiding feed of at least one of the document to be delivered to a front surface of the transparent cover and the recording paper to be delivered to a region of the substrate carrying the printing elements. Such an arrangement allows the document and the recording paper to be fed properly without any interference between the two, despite the fact that the document and the recording paper are to be fed relatively closely to each other on the same side of the substrate. Further, since the image read/write head is provided in itself with the guide means for guiding feed of the document or the recording paper, an image processing apparatus incorporating this image read/write head can have a simplified peripheral structure around the head and, hence, can be assembled easily.

In a further preferred embodiment, the case is provided with a first guide surface extending outwardly from one side edge of the front surface of the transparent cover, the first guide surface being defined by a ridge protruding toward the first side portion of the substrate, and a concave second guide surface rising thicknesswise of the case from a portion adjacent the printing element carrying region of the substrate, the first and second guide surfaces forming the guide means. With such an arrangement, the first guide surface is capable of properly guiding the document to the front surface of the transparent cover, while the second guide surface is capable of properly guiding the recording paper to the printing element carrying region of the substrate. Further, since the second guide surface is concave, the advancing direction of the recording paper guided by the second guide surface can be largely changed to the extent that it is substantially reversed, whereby the recording paper can be prevented from interfering with the document. Furthermore, the image processing apparatus can further be downsized by positioning part of the platen roller for feeding the recording paper proximately to and as embraced by the concave guide surface.

A preferred embodiment further comprises a heat sink plate superposed on a reverse side of the substrate, the heat sink plate having an extra portion extending beyond the first side portion of the substrate, the extra portion defining a third guide surface continuous with a portion of the substrate adjacent the printing element carrying region of the substrate. This arrangement allows the recording paper to be fed more properly by cooperation of the third guide surface defined by the heat sink plate and the second guide surface defined by the lateral surface of the case.

In a preferred embodiment of the image read/write head according to the second aspect of the invention, the light-receiving elements provide a row of light-receiving faces extending in a primary scanning direction, each of the light-receiving faces having a secondary scanning direction width which is larger than a pitch between the light-receiving faces in the primary scanning direction.

In the image read/write head according to the second aspect of the invention, the lens unit is inclined and, hence, the light-receiving face of each light-receiving element receives light having passed through the lens unit not perpendicularly but obliquely. Though the amount of light received by each light-receiving face per unit area decreases accordingly, the construction according to the second aspect intentionally expands the dimension of each light-receiving face in the secondary scanning direction to avoid a decrease in the total amount of light received by each light-receiving face, thereby avoiding a degradation in the quality of an image read.

In a preferred embodiment, the case has inner wall surfaces defining an internal space of the case, at least part of the inner wall surfaces serving as a reflective surface which is rendered white to provide a high light-reflectivity.

Light emitted from the light source travels in the internal space defined by the inner wall surfaces while being reflected by the inner wall surfaces. In the above construction, the inner wall surfaces have a high light-reflectivity. For this reason, this construction can reduce a loss of light emitted from the light source during traveling as compared with a conventional construction in which inner wall surfaces defining such an internal space is formed of a black-colored resin having a lower light-reflectivity. Stated otherwise, the above construction according to the present invention is capable of efficiently leading light emitted from the light source to the image reading region while allowing such light to be reflected by the reflective surface at a high reflectivity.

The image read/write head according to this embodiment, accordingly, is not required to use a light source emitting a large amount of light or a multiplicity of light sources for illuminating the image reading region with a higher illuminance. This allows the manufacturing cost of the image read/write head as well as the running cost to be reduced. Further, since this image read/write head meets an essential requirement such as to illuminate the image reading region with a high illuminance, it is possible to upgrade the quality of images read, hence, improve the reproducibility of the image of a document recorded on the recording paper.

It should be noted that the present invention may employ appropriate means for making the inner wall surfaces defining the internal space serve as the reflective surface which is rendered white, for example, means for forming the case entirely of a white-colored resin, means for applying a white-colored coating on the inner wall surfaces, or means for affixing a white-colored member such as a white-colored sheet to the inner wall surfaces defining the internal space.

Where the case is formed entirely of a white-colored resin, it is preferred that the case should have a chamber for accommodating the light-receiving elements, the chamber being provided with reflection-preventive means covering inner wall surfaces of the chamber to enclose the row of the light-receiving elements, the reflection-preventive means including a light-absorptive surface having a lower light-reflectivity than the inner wall surfaces of the chamber.

In such an arrangement, the chamber in which the light-receiving elements are to be disposed is provided with the reflection-preventive means thereby forming the light-absorptive surface having a low light-reflectivity around the row of the light-receiving elements. Thus, irregular reflection of light within the chamber can appropriately be prevented and, hence, such a situation can be avoided that most of irregularly reflected light becomes incident on the light-receiving elements. Accordingly, it is possible to avoid a decrease in the resolution of an image read or in the reproducibility of the image of a document, which would otherwise occur due to the case formed entirely of a white-colored resin.

The above light-absorptive surface is formed of a black-colored member fitted in the chamber. Alternatively, the light-absorptive surface may be formed of a black-colored coating applied on the inner wall surfaces of the chamber, or a black-colored sheet or film bonded to the inner wall surfaces of the chamber.

Other features and advantages of the present invention will become more apparent from the following detailed description given with reference to the attached drawings.

BEST MODE FOR CARRYING OUT THE INVENTION

Figure 1:
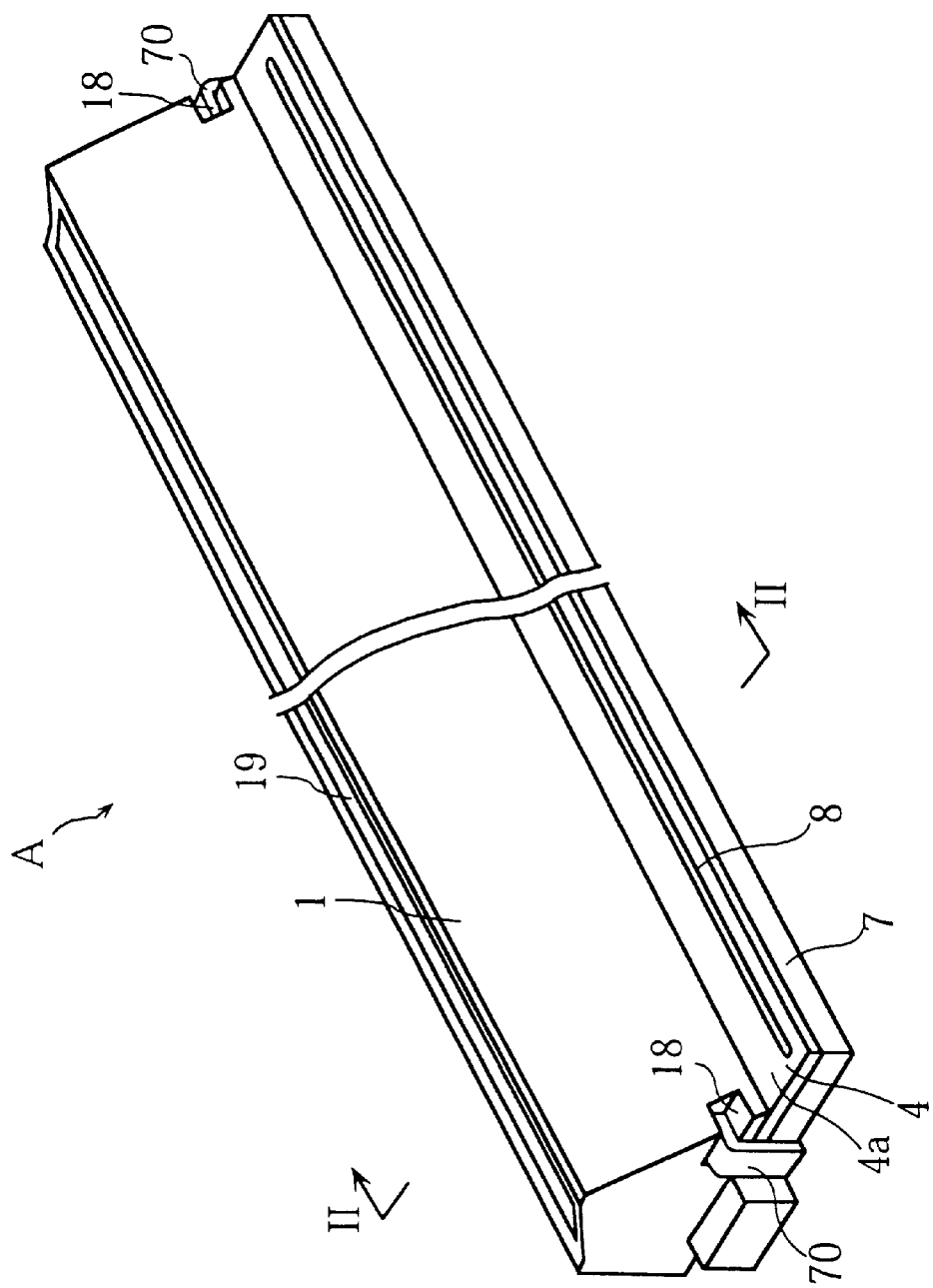
FIG. 1 is a perspective view showing the entirety of a first embodiment of an image read/write head according to the present invention.
Figure 2:
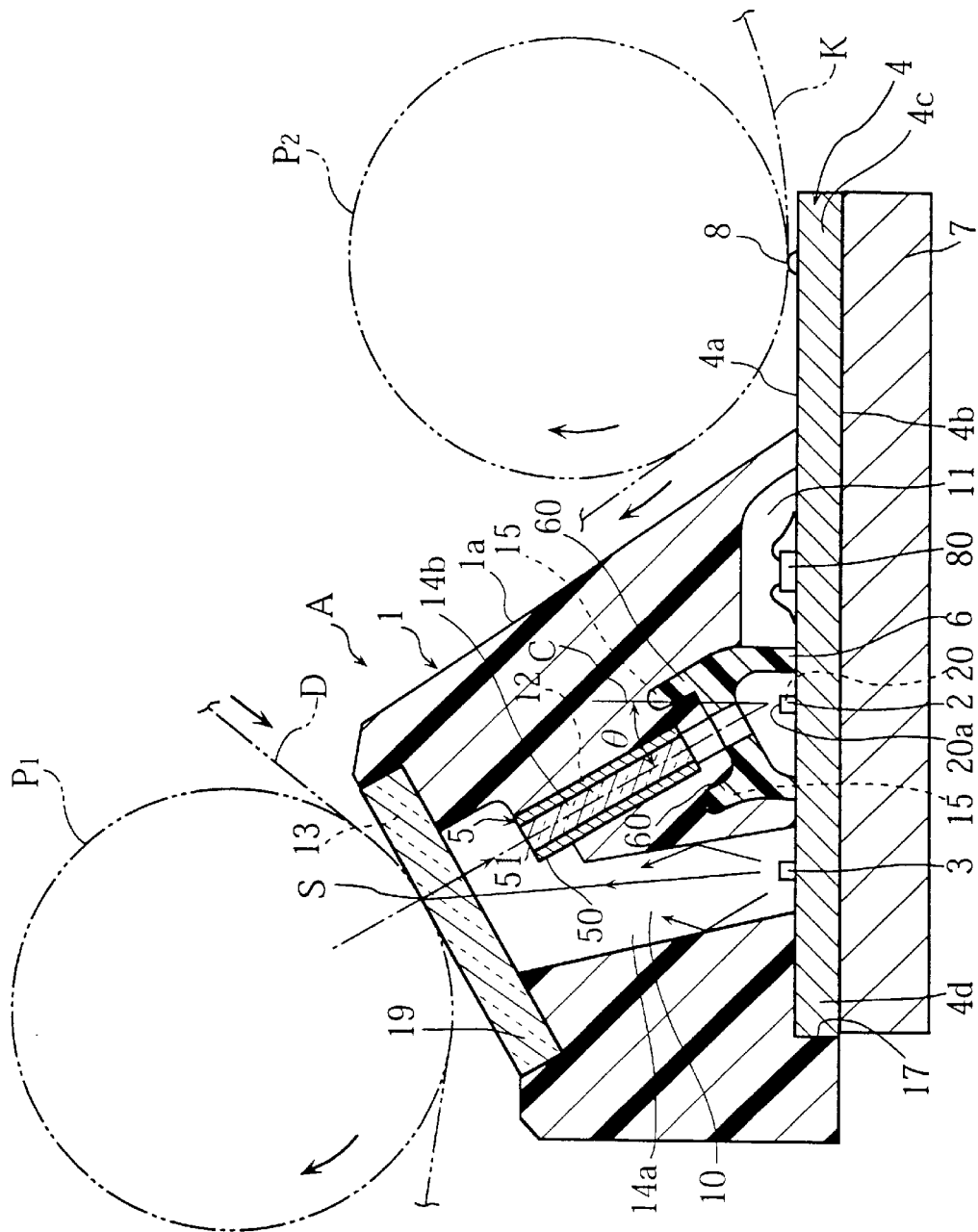
FIG. 2 is a sectional view taken along line II—II in FIG. 1.
Figure 3:
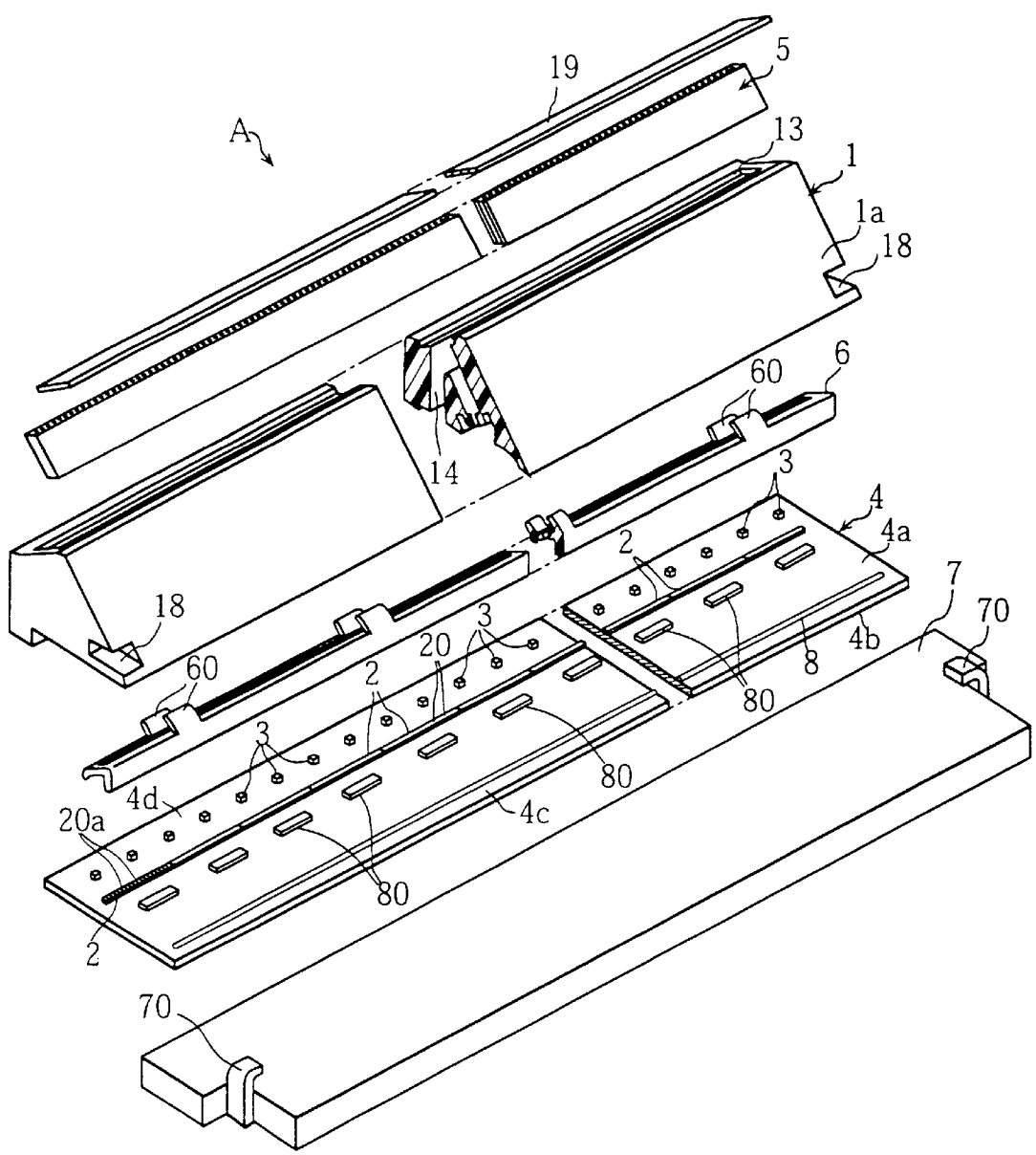
FIG. 3 is an exploded perspective view of the image read/write head shown in FIG. 1.

FIGS. 1 to 3 illustrate an image read/write head A as a first embodiment of the present invention.

As better shown in FIGS. 2 and 3, the image read/write head A according to this embodiment includes a case 1, a transparent cover 19, a lens array 5, a substrate 4, a heat sink plate 7, and other parts to be described later.

The substrate 4 is made of, for example, a ceramic material and configured into an elongate rectangle in plan view having a first widthwise side portion 4c and a second widthwise side portion 4d. On a front surface 4a of this substrate 4 are mounted a plurality of light sources 3, a plurality of sensor IC chips 2, a plurality of driving ICs 80, and a plurality of heat-generating elements 8.

The light sources 3 each comprise, for example, an LED chip, and are arrayed in row with appropriate intervals longitudinally of the substrate 4. The sensor IC chips are each a semiconductor chip incorporated integrally with a plurality of light-receiving elements 20 each having a respective light-receiving face 20a, and are arrayed in row longitudinally of the substrate in a generally parallel relationship to the row of light sources 3. The direction of the row of the plurality of sensor IC chips (more exactly, the direction of the row of the light-receiving faces 20a) is the primary scanning direction. Detailed description will be given later of the configurations of the sensor IC chips 2 and the light-receiving elements 20 incorporated therein.

The heat-generating elements 8 are each equivalent to an example of "printing element" termed in the present invention. Each of the heat-generating elements 8 is formed by printing and baking a thick film resistor paste containing, for example, ruthenium oxide as its conductive component to form a linear heat-generating resistor continuously extending longitudinally of the substrate 4 and electrically cutting this heat-generating resistor at a predetermined spacing to form a wiring pattern. The driving ICs 80, which are adapted to control the heat-generating operation of the heat-generating elements 8, are also arrayed in row with appropriate intervals longitudinally of the substrate 4. The row of heat-generating elements 8 extends along the first side portion 4c of the substrate 4. The front surface 4a of the substrate 4 is formed with wiring patterns (not shown) associated with the light sources 3, sensor IC chips, driving ICs 80 and heat-generating elements 8, respectively. The substrate 4 is provided in an appropriate portion thereof with a single or plural connectors (not shown) electrically connected to respective wiring patterns. When required wiring and connection to the connectors are made, the image read/write head becomes capable of allowing power supply to each component from an external device and input/output of various signals to be achieved.

The case 1 is made of a synthetic resin and has a full longitudinal length generally equal to that of the substrate 4. As better shown in FIG. 2, the case 1 is mounted to the front surface 4a of the substrate 4 to enclose the light sources 3, sensor IC chips 2 and driving ICs 8. The case 1 has a hole 10 extending thicknesswise through the case 1, and a recess 11 defined at the bottom of the case 1, the light sources 3 being located at the bottom of the case 1 within the hole 10. Within the recess 11 are located the sensor IC chips 2 and driving ICs 80. The first side portion 4c and a portion of the substrate 4 adjacent thereto extend beyond one lateral surface of the case 1, and this excess portion carries the heat-generating elements 8 on a front surface thereof. Of the opposite lateral surfaces widthwise of the case 1 (in the direction transverse to the longitudinal direction of the case 1), the lateral surface 1a situated closer to the heat-generating elements is inclined such that the lateral surface 1a becomes closer to the second side portion 4d of the substrate 4 as it extends upward.

The transparent cover 19 is adapted to guide a document D to be read and is a transparent plate made of, for example, glass or a synthetic resin. On the front surface of this transparent cover 19 is defined a fixed linear region extending in the primary scanning direction which serves as an image-reading region S at which the image of a subject is to be read. The transparent cover 19 is mounted to the case 1 by, for example, being fitted into a depression 13 defined in the upper surface of the case 1. Since the upper surface of the case 1 is inclined, the transparent cover 19 mounted to the case 1 is also inclined. More specifically, the transparent cover 19 is inclined such that the height of the cover 19 decreases as the cover 19 becomes closer to the first side portion 4d of the substrate 4.

Within the case 1 are provided a first optical path 14a for guiding light emitted from the light sources 3, and a second optical path 14b. The first optical path 14a is adapted to guide light emitted from the light sources 3 to the image-reading region S and is defined by the hole 10. On the other hand, the second optical path 14b is adapted to guide light reflected by a surface of the document D located in the image-reading region S to the light-receiving face 20a of each light-receiving element 20. The first optical path 14a extends generally perpendicularly to the front surface 4a of the substrate 4, whereas the second optical path 14b is inclined so as to become closer to the first side portion 4c with lowering position.

The lens array 5 forms part of the second optical path 14b and is fitted in a groove 12 of the case 1 with its upper end located to face the image-reading region S and with its lower end located to face the light-receiving faces 20a. The lens array 5 comprises a row of rod lenses 51 held by a block-shaped lens holder 50 extending in the primary scanning direction. Use of rod lens 51 as a component of the lens array allows the image of the document D to be formed as an erect image of 1× magnification on the light-receiving faces 20a. Nevertheless, the present invention may use any lens of the type different from the rod lens (for example, a convex lens or a combination of a plurality of lenses). The lens array is inclined in the same direction as the second optical path 14b.

Figure 5:
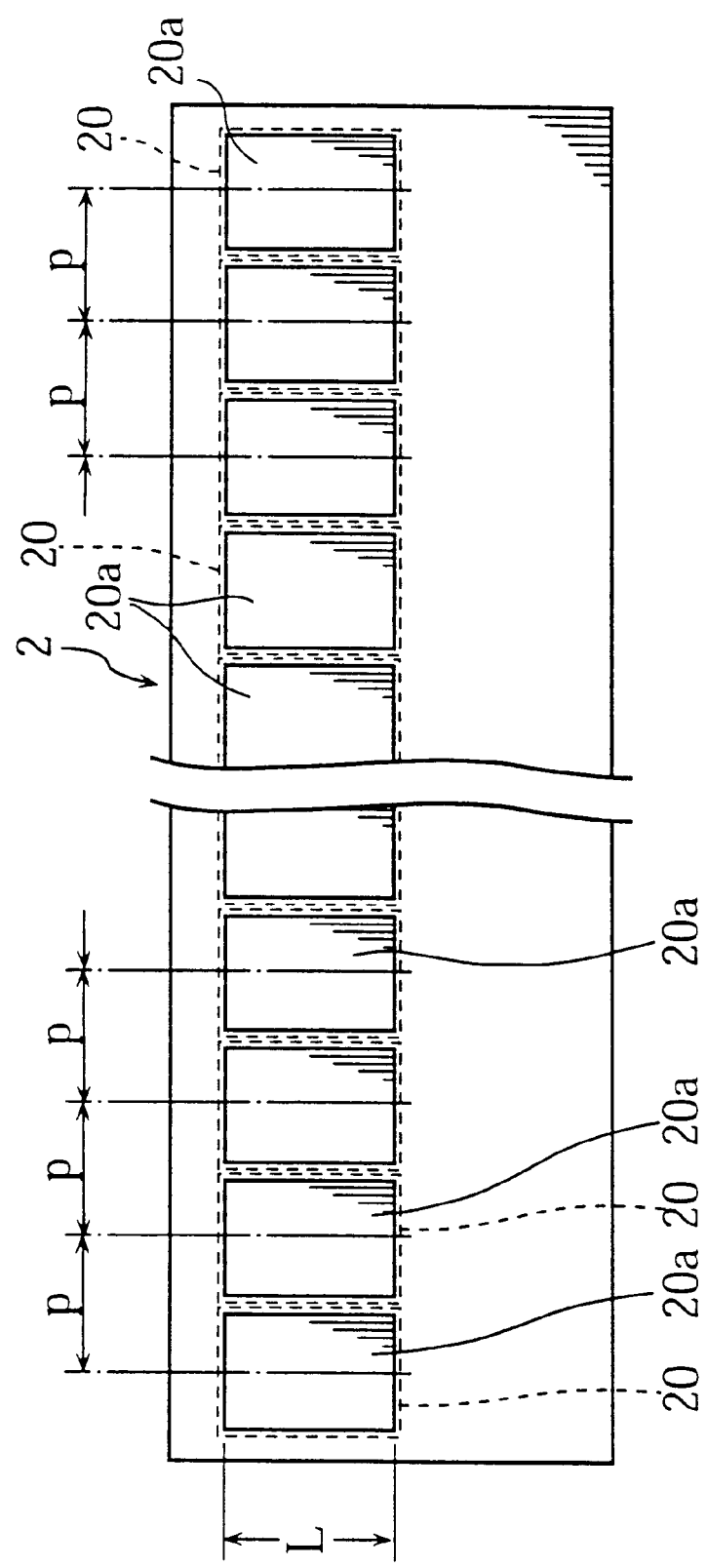
FIG. 5 is an enlarged plan view showing a sensor IC chip of the image read/write head shown in FIG. 1.

As better shown in FIG. 5, each of the sensor IC chips 2 is configured into an elongate rectangle in plan view and incorporates light-receiving elements 20 having their respective light-receiving faces 20a, each shaped rectangular in plan view. Where, for example, a document of A4 size in width is to be read at a reading density of 8 dot/mm, the total number of light-receiving elements 20 required is 1728. Accordingly, if each sensor IC chip 2 incorporates 96 light-receiving elements 20, the number of sensor IC chips 2 to be mounted to the substrate 4 is 18 in total.

The light-receiving elements 20 each have a photoelectric conversion function such as to output a signal (video signal) having a power level corresponding to the amount of light received by respective light-receiving face 20a. Each of the sensor IC chips 2 also incorporates an electronic circuit for serially outputting such video signals from the light-receiving elements in a predetermined sequence. The light-receiving faces 20a are arrayed in row with a constant pitch p longitudinally of the sensor IC chips 2 (in the primary scanning direction). This pitch p is the reading pitch in the primary scanning direction of the image read/write head A.

The width L of each light-receiving face 20a in the secondary scanning direction is made larger than the pitch between the light-receiving elements 20a. More specifically, the width L meets L=p·secθ (refer to FIG. 6), where θ is an angle of inclination of the lens array 5 relative to a line C which is normal to the light-receiving face 20a, as better shown in FIGS. 2 and 6.

The case 1 is made of, for example, a white-colored resin comprising polycarbonate containing titanium oxide. In this case, the case 1 has surfaces which are rendered highly light-reflective (for example, a light-reflectivity of about 97% to about 98%). Accordingly, the inner wall surfaces defining the first optical path 14a are also rendered highly light-reflective. Such an arrangement is capable of guiding light emitted from the plurality of light sources 3 to the image-reading region S while allowing such light to be reflected by the inner wall surfaces of the first optical path 14a, thereby enhancing the illuminating efficiency of light illuminating the image-reading region S.

The case 1 is provided at a lower portion thereof with an auxiliary member 6 for enclosing the sensor IC chips 2.

This auxiliary member 6 is made of, for example, an ABS resin containing a black pigment and has black-colored surfaces having a high light-absorptivity. The arrangement with the provision of the auxiliary member 6 is capable of eliminating the possibility of scattering and irregular reflection of light traveling around the sensor IC chips 2 after having passed through the lens array 5, thereby providing images read of higher quality. The auxiliary member 6 is attached to the case 1 by fitting projections 60, 60 formed at an upper portion thereof into corresponding recesses 15, 15 defined in the case 1. Scattering of light around the sensor IC chips 2 may be prevented otherwise by forming a black-colored coating on the inner surface of a portion of the case 1 enclosing the sensor IC chips 2 or by affixing a black-colored sheet or film to that inner surface, instead of providing such a black-colored member 6.

The aforementioned heat sink plate 7 is formed into a plate of substantially the same configuration and size as the substrate 4 and is bonded to reverse side 4b of the substrate 4 with a double-sided adhesive tape, an adhesive or the like. The heat sink plate 7 is made of a metal having a high thermal conductivity, for example, aluminum or iron. In the image read/write head A, it is desired that the heat sink plate 7 should have a linear expansion coefficient in proximity to that of the substrate 4 or the case 1 in preventing the entire image read/write head A from warping due to influences of heat. To this end, the material of the heat sink plate 7 is, for example, a stainless steel having a linear expansion coefficient of, for example, $10 \times 10^{-6}$ [1/°C.]. The linear expansion coefficient of the ceramic-made substrate 4 is $7.7 \times 10^{-6}$ [1/°C.]. If, for example, a liquid crystal polymer is adopted as the material of the case 1, the linear expansion coefficient of the case 1 assumes $10 \times 10^{-6}$ [1/°C.]. By thus doing, these three components can have respective linear expansion coefficients in proximity to each other.

As shown in FIGS. 1 and 3, the heat sink plate 7 has longitudinally opposite ends provided with engaging protrusions 70, 70, respectively. These engaging protrusions 70, 70 are erected upwardly of the heat sink plate 7 with their respective tip portions bent into a substantially L shape. Though these engaging protrusions 70, 70 may be formed integrally with the heat sink plate 7, they may be formed otherwise by, for example, attaching a member formed separately from the heat sink plate 7 to the heat sink plate 7.

On the other hand, the case 1 defines dented portions 8, 18 at longitudinally opposite ends thereof. These dented portions 18, 18 are located on one side closer to the heat-generating elements 8 in the transverse direction of the case 1. As better shown in FIG. 1, the case 1 on the front surface 4a of the substrate 4 is fixedly positioned relative to the substrate 4 by fitting the tip portions of the engaging protrusions 70, 70 into the corresponding dented portions 18, 18 for engagement. By thus doing, a lower edge of the case 1 on the side adjacent the first side portion 4c of the substrate 4 is brought into more intimate contact with the upper surface of the substrate 4, thereby preventing the occurrence of such a feeding failure that the recording paper K is caught by a clearance which would otherwise be defined between the case 1 and the substrate 4.

As better shown in FIG. 2, the case 1 has a step portion 17 at the bottom thereof for engagement with the second side portion 4d of the substrate 4. The engagement between these two portions 17 and 4d enables the case 1 to be placed in position relative to the substrate 4 in the transverse direction of the case 1.

Figure 4:
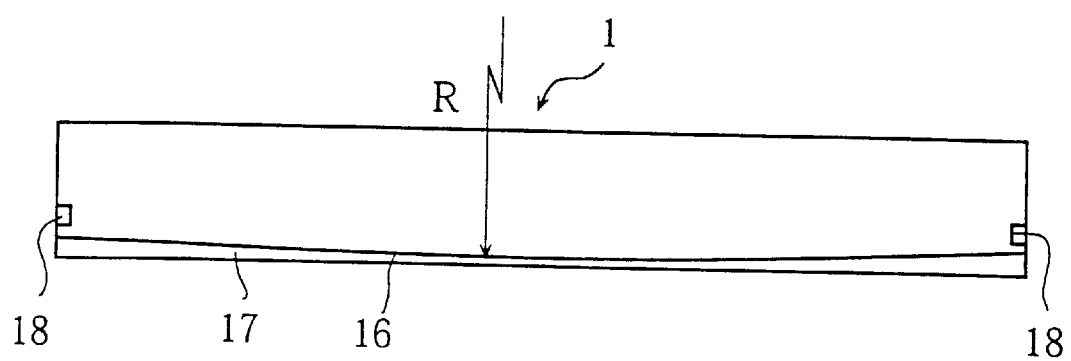
FIG. 4 is a front elevational view showing a case of the image read/write head shown in FIG. 1.

Further, as better shown in FIG. 4, the case 1 has a bottom surface 16 adapted to face and come into contact with the substrate 4, the bottom surface 16 being formed into a curved convex surface having an appropriate radius of curvature in a state where the case 1 is separated from the substrate 4, the convex surface bulging downward as it extends toward the center thereof from any one of the longitudinally opposite ends thereof. This configuration achieves more intimate contact between the substrate 4 and an intermediate portion of the bottom surface of the case 1 when the longitudinal opposite ends of the case 1 are engaged with the substrate 4 carried on the heat sink plate 7. As a result, it is possible to prevent such a feeding failure of the recording paper that the recording paper is caught by a clearance which would otherwise be defined between the case 1 and the substrate 4.

Figure 7:
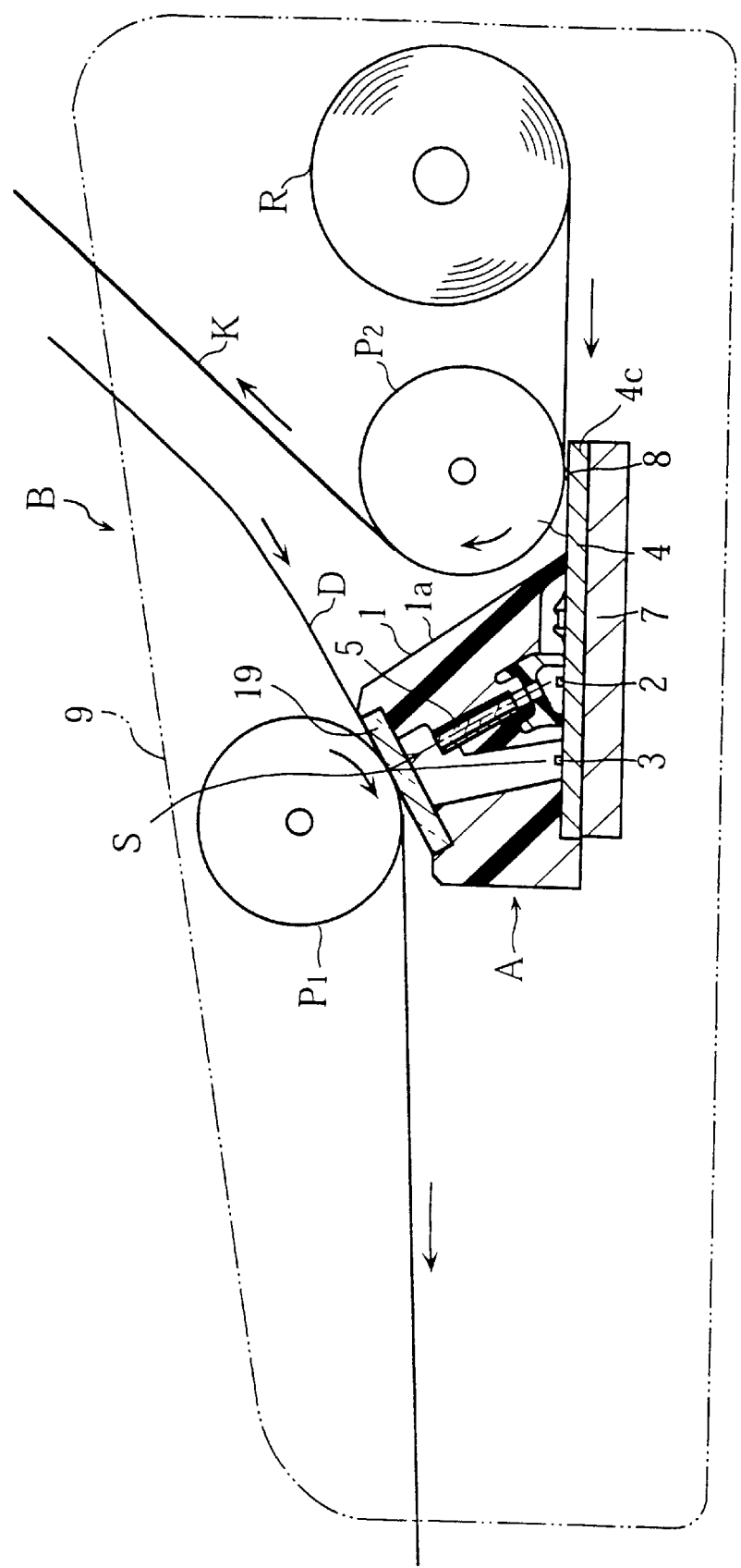
FIG. 7 is a schematic view illustrating the construction of an example of an image processing apparatus incorporating the image read/write head shown in FIG. 1.

FIG. 7 is a schematic view illustrating the construction of an example of an image processing apparatus B incorporating the foregoing image read/write head A.

This image processing apparatus B incorporates the image read/write head A within a casing 9 made of, for example, a synthetic resin, and includes a rotatably driven platen roller P1 for feeding the document D at a location facing the image-reading region S defined on the front surface of the transparent cover 19. The image processing apparatus B further includes a rotatably driven platen roller P2 for feeding the recording paper K at a location facing the heat-generating elements 8. The recording paper K is, for example, a continuous sheet of heat-sensitive paper unrolled from a wind-up roll R. Of course, the present invention is not limited to the use of such a continuous sheet of heat-sensitive paper and may use, for example, a short-cut sheet of recording paper.

The image read/write head A and the image processing apparatus B operate as follows.

The image read/write head A incorporated in the image processing apparatus B has both the image-reading function and the image-forming function. The operation of reading the image of the document D is performed in the following manner. The document D is fed while contacting the transparent cover 2 by the platen roller P1 rotating, with a portion of the document D corresponding to the image-reading region S being efficiently illuminated. Light reflected by the document D is gathered by the lens array 4 to form an image on corresponding light-receiving faces of the sensor IC chips 2. Each of the sensor IC chips 2 outputs an analog signal having a power level corresponding to the amount of light received by each light-receiving face. This signal is taken out of the image read/write head A from a connector not shown through a cable, thus completing the reading of a portion of the image corresponding to a single line. The document D is fed intermittently line by line or continuously in the direction indicated by the relevant arrow in the drawing by the platen roller P1, and like reading operations are performed one after another to read the image of the entire document D.

In recording the image onto the recording paper K, on the other hand, image data is inputted to each driving IC 80 from the outside of the image read/write head A. Then, each driving IC 80 selects heat-generating elements to be driven based on the image data thus inputted and energizes these heat-generating elements thus selected to cause them to generate heat. Thus, a portion of the image corresponding to a single line is recorded onto the recording paper K. The recording paper D is fed intermittently line by line or continuously in the direction indicated by the relevant arrow in the drawing by the platen roller P2, and like recording operations are performed one after another.

In the image read/write head A, as shown in FIG. 2, the lens array 5 and the second optical path 14b including this lens array 5 are inclined and, hence, the optical path from the image-reading region S to the light-receiving faces 20a has an increased length. Accordingly, a lens having a larger focal depth can be employed as rod lens 51 forming the lens array 5 to allow the image of the document to be formed on the light-receiving faces 20a with less possibility of the so-called "out-of-focus" phenomenon.

Figure 6:
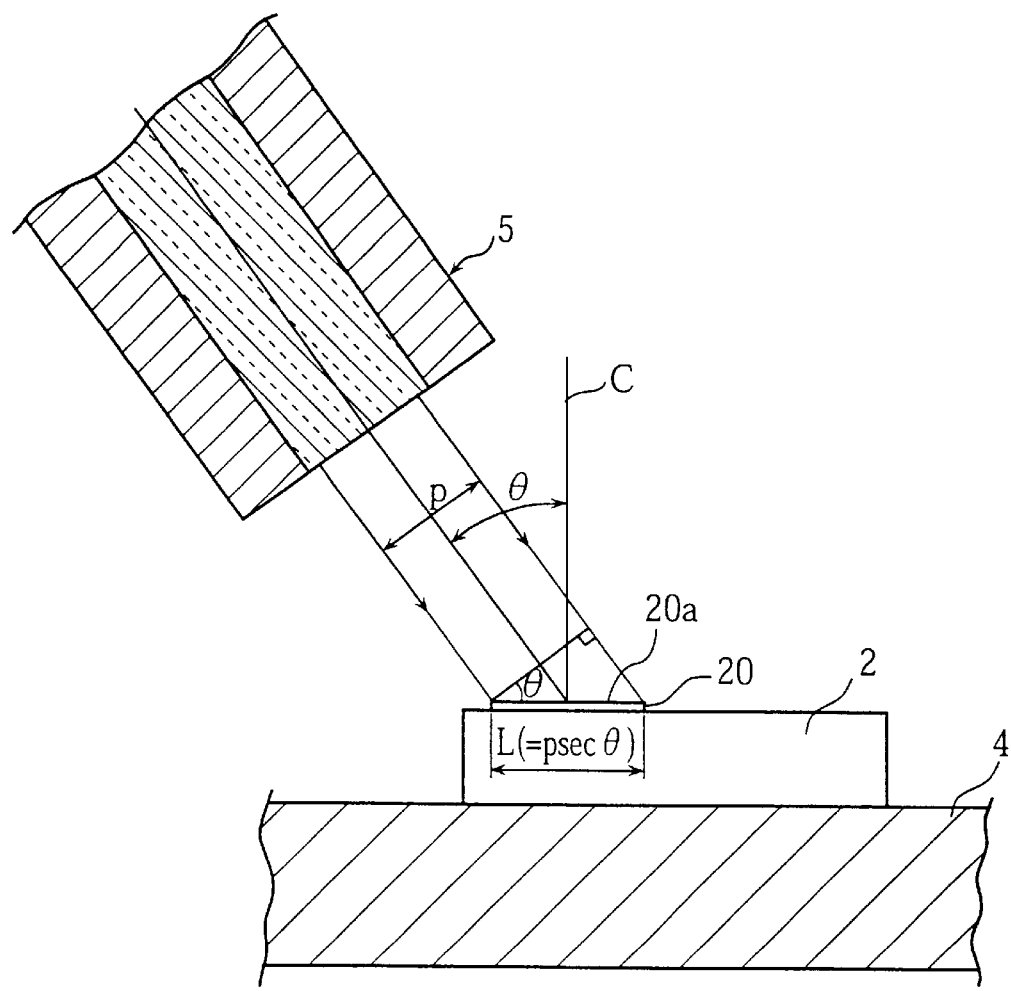
FIG. 6 is a view illustrating an operation of the image read/write head shown in FIG. 1.
Figure 8:
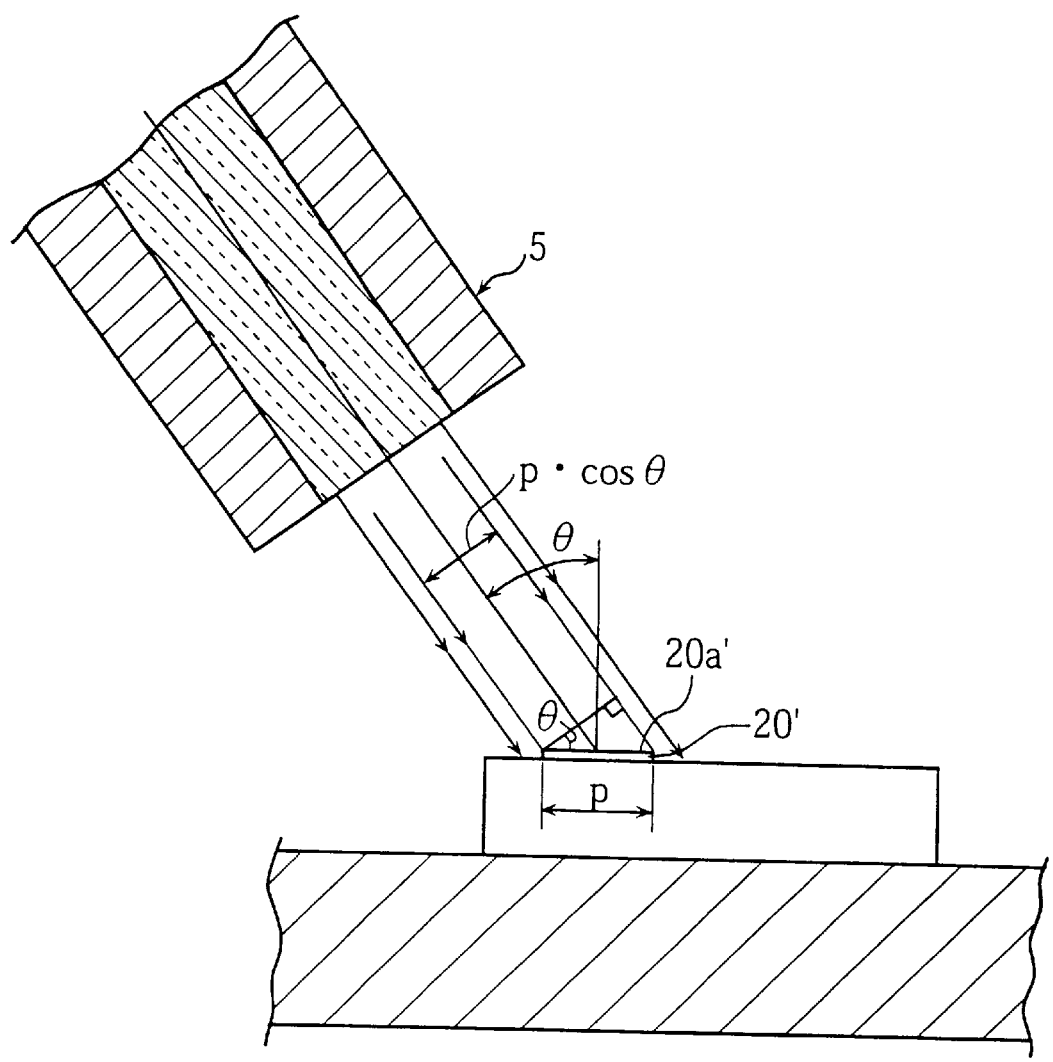
FIG. 8 is a view illustrating an operation of the image read/write head shown in FIG. 1 for comparison.

In the image read/write head A, since the width L of the light-receiving face 20a of each light-receiving element in the secondary scanning direction meets $L = p \cdot \sec \theta$ as shown in FIG. 6, the light-receiving face 20a can receive the right amount of light of an entire light beam having a width p which has passed through the inclined lens array 5. Accordingly, where the image processing apparatus B performs the image reading in the secondary scanning direction with a pitch equal to the pitch p of the image reading in the primary scanning direction, the amount of light received at each light-receiving face 20a can be maximized, while at the same time the light-receiving face 20a is prevented from receiving those rays of light that are unnecessary in the image reading. Therefore, any degradation does not occur in the quality of images read due to an insufficient amount of light received at each light-receiving face 20a. This advantage becomes more apparent when compared with the arrangement shown in FIG. 8 where the width of light-receiving face 20a' of a light-receiving element 20' in the secondary scanning direction is equal to the reading pitch p in the primary scanning direction and the light-receiving face 20a' is capable of receiving a light beam having a width of no more than $p \cdot \cos \theta$.

As can be understood from FIG. 7, the two platen rollers P1 and P2 both can be positioned above the substrate 4 of the image read/write head A. This means that the three components, i.e., the two platen rollers P1 and P2 and the image read/write head A, can be prevented from becoming bulky in the direction of the height of the image processing apparatus B, thereby making the image processing apparatus B thinner.

Further, since the lateral surface 1a of the case 1 facing the platen roller P2 is inclined in the image read/write head A, a relatively large space can be secured above the first side portion 4c extending beyond the case 1 for positioning the platen roller P2 therein. Thus, the platen roller P2 can properly be positioned without necessity of making the first side portion 4c extend beyond the case 1 very largely. This feature is more preferable in downsizing the whole apparatus.

Furthermore, since the transparent cover 19 is inclined, it is possible to position the platen roller P1 facing this transparent cover 19 at a location appropriately spaced from the other platen roller P2. This arrangement can avoid improper interference between these rollers P1 and P2 even when their respective diameters are increased.

The platen rollers P1 and P2 need to be incorporated within the casing 9 so that the document D and the recording paper K should be pressed against the front surface of the transparent cover 19 and the front surfaces of the heat-generating elements 8, respectively. By virtue of these platen rollers P1 and P2 which can both be located above the image read/write head A, the operation of placing the rollers P1 and P2 into the casing 9 can be achieved from one side with higher operability. Further, since the platen rollers P1 and P2 press against the transparent cover 19 and the heat-generating elements 8, respectively, in the same direction, the structures required therefor can be made very simple.

Meanwhile, the image-reading operation and the image-recording operation may be performed either separately or simultaneously. In simultaneous operations, the feeding of the document D by the platen roller P1 and the feeding of the recording paper K by the platen roller P2 are performed simultaneously, which may cause the document D and the recording paper K to interfere with each other thereby hindering the document D and the recording paper K from being fed smoothly. The image read/write head, however, can avoid such an interference between the document D and the recording paper K because the platen rollers P1 and P2 are sufficiently spaced from each other in the major plane of the substrate 4.

As has been described with reference to FIGS. 2 and 3, the image read/write head A has the light sources 3, sensor IC chips 2, driving ICs 80 and heat-generating elements 8, all mounted to the front surface 4a of the substrate 4, with the wiring patterns associated with these components being also formed on the front surface 4a. Thus, there is no need to turn the substrate 4 upside down or downside up in the operation of mounting these components or in the operation of forming these wiring patterns, resulting in higher productivity. The operation of assembling the case 1 with the substrate 4 can also be achieved with ease by placing the case 1 on the substrate 4 and then fitting the engaging protrusions 70, 70 of the heat sink plate 7 into the corresponding dented portions 18, 18 of the case 1 for engagement between the case 1 and the heat sink plate 7. The engaging protrusions 70, 70 may be given a role of positioning the case 1 and the substrate 4 relative to each other, and it is possible to establish a proper positional relation between different electronic components, such as the sensor IC chips 2 and the light sources 3, and the corresponding portions of the case 1. With the structure using the engaging protrusions 70, 70 for assembling the case 1 with the substrate 4, the substrate 4 is sandwiched between the case 1 and the heat sink plate 7 engaged with each other. Thus, it is possible to stabilize the positional relation between the heat sink plate 7 and the substrate 4.

In the image read/write head A when driven, the heat-generating elements 8, light sources 3 and the like generate heat, which, however, can be dissipated to the outside through the heat sink plate 7. This arrangement is capable of stabilizing the temperature of the heat-generating elements 8, hence, avoiding a degradation in the quality of images to be outputted as printed on the recording paper K.

Figure 9:
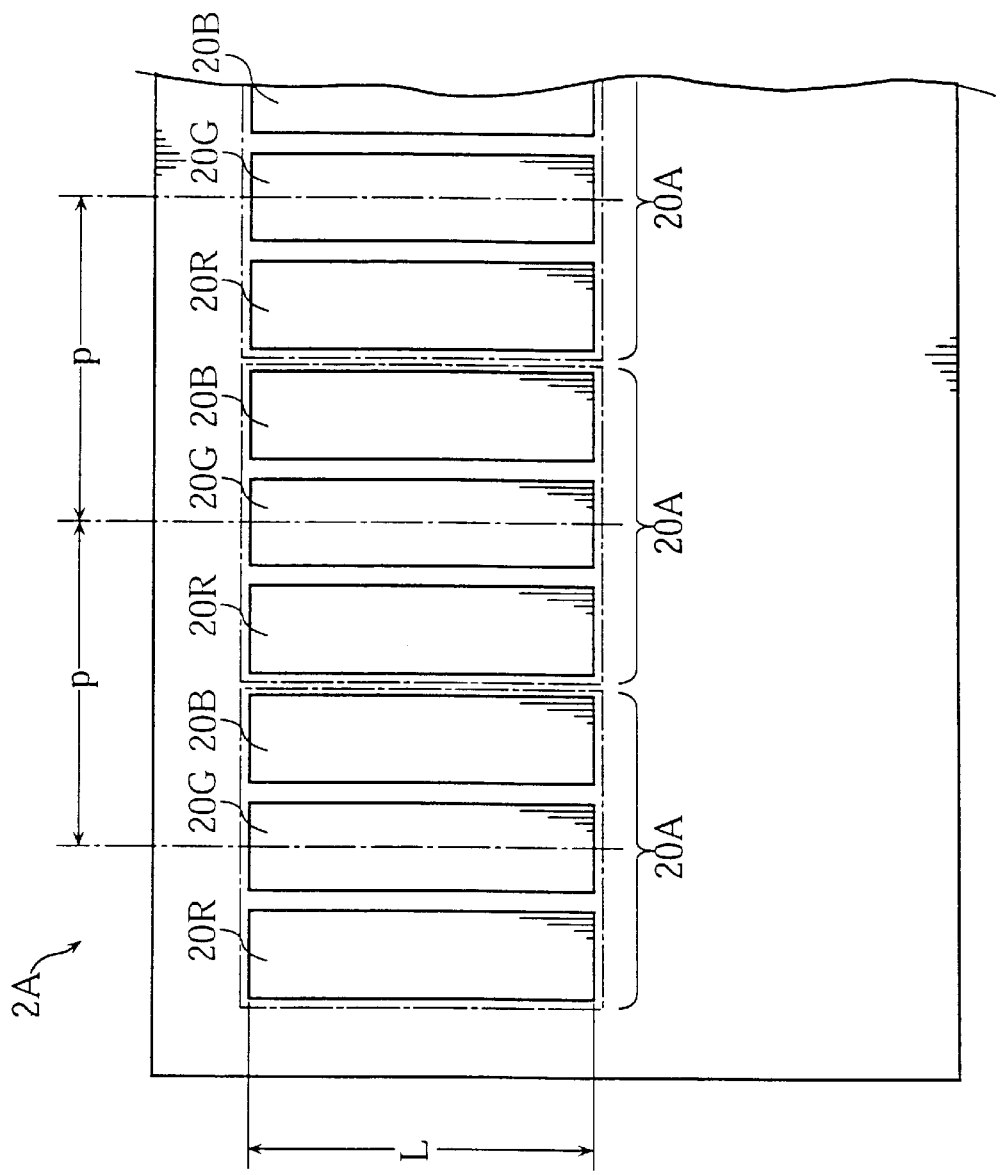
FIG. 9 is an enlarged plan view showing another example of a sensor IC chip for use in the image read/write head shown in FIG. 1.

Though the width L of light-receiving face 20a of each light-receiving element 20 in the secondary scanning direction meets L=p·sec θ in the foregoing embodiment, the width L of the light-receiving face in the secondary scanning direction is required only to be larger than the pitch p between the light-receiving faces (relation: p<L) in appropriately preventing a decrease in the amount of light received by each light-receiving face 20a. Preferably, however, the width L is not more than p·sec θ, and practically, slightly less than p·sec θ. As already described, the pitch between the light-receiving faces in the primary scanning direction is equal to the reading pitch in the primary scanning direction. Accordingly, in the case where, for example, a plurality of light-receiving elements 20A provided in a sensor IC chip 2A are configured to read color images and a light-receiving element 20A corresponding to one pixel has three sorts of light-receiving faces 20R, 20G and 20B for reading three colors R, G and B (red, green and blue) as shown in FIG. 9, the pitch p in the primary scanning direction is the pitch between light-receiving face sets each consisting of three sorts of light-receiving faces 20R, 20G and 20B.

Further, though the pitch p between the light-receiving faces 20a in the primary scanning direction forms the basis for determining the width L of each light-receiving face 20a in the secondary scanning direction in the foregoing embodiment, the present invention is not limited thereto. An image processing apparatus is desirably constructed to perform image reading indifferent modes which can be switched to each other to accommodate a user's request, for example, a normal mode (image-reading mode with an ordinary pitch) and a fine mode (image-reading mode with a finer pitch). In this case, the reading pitch in the secondary scanning direction is not constant and hence may differ from the reading pitch in the primary scanning direction. Even in such a case, each light-receiving face can receive an increased amount of light by determining the width L of each light-receiving face in the secondary scanning direction to meet L>p'·m, where p' is a minimum image-reading pitch in the secondary scanning direction and m is an image magnification of the lens.

Specifically, where p'=130 μm and the image magnification of the lens is 1×, or m=1, the width L of each light-receiving face in the secondary scanning direction is made larger than 130 μm. When the reading pitch in the secondary scanning direction is set 130 μm with use of a lens having an image magnification of 1×, a decrease in the amount of light traveling obliquely toward and received by each light-receiving face can appropriately be prevented by making the width of each light-receiving face in the secondary scanning direction larger than 130 μm. In order for each light-receiving face to receive a maximized amount of light while avoiding light from an unnecessary portion of the document, the width L is determined to meet L=p'·m·sec θ.

Figure 10:
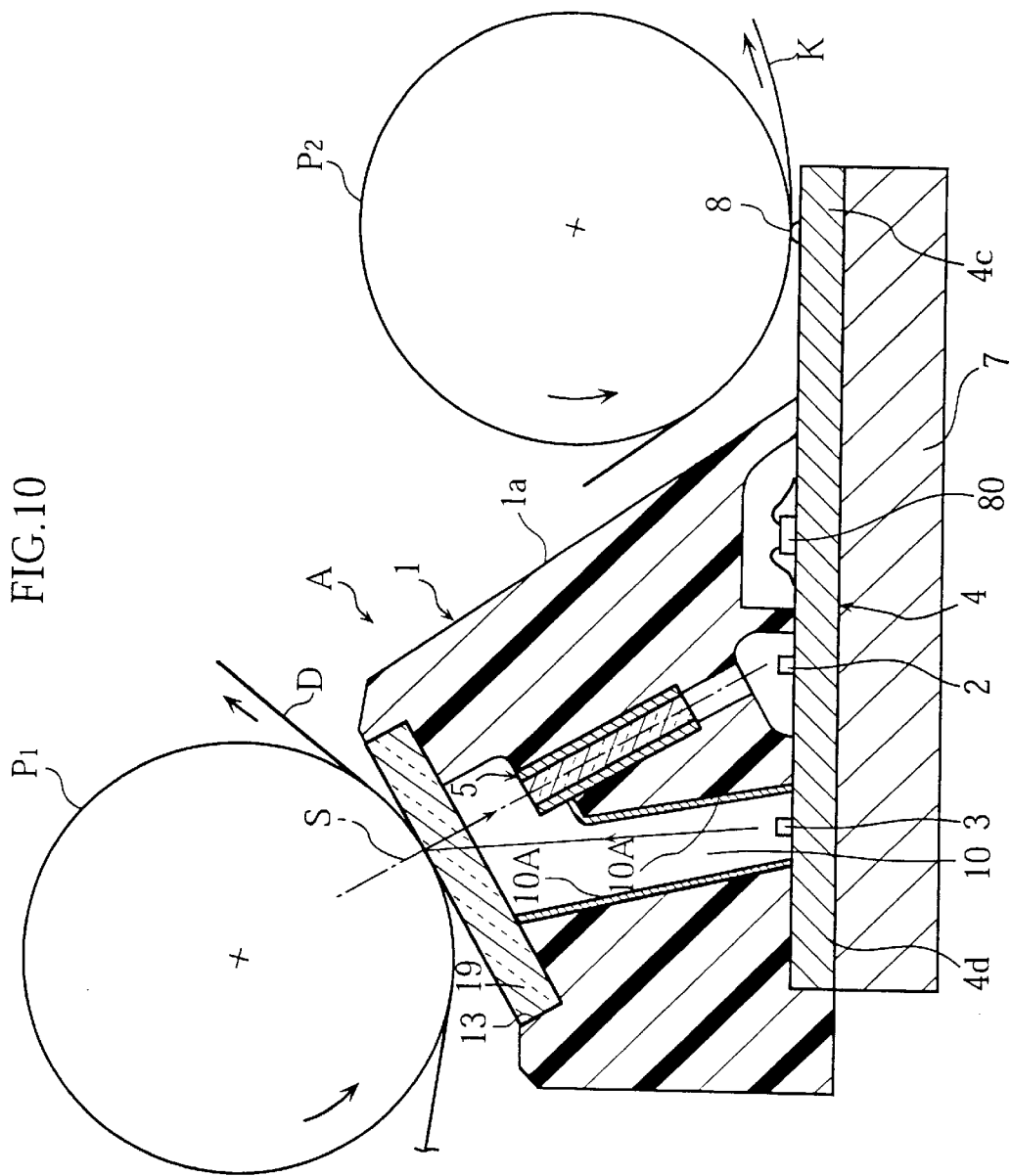
FIG. 10 is a sectional view showing a second embodiment of an image read/write head according to the present invention.

While the case 1 is formed entirely of a white-colored resin to make the inner wall surfaces thereof serve as highly reflective surfaces in the foregoing image read/write head A, such a highly reflective surface may be provided otherwise by adopting an appropriate means such as to cover the inner wall surfaces with a white-colored coating or sheet 10A as in, for example, a second embodiment of the present invention shown in FIG. 10. It is to be noted that other features of the second embodiment shown in FIG. 10 are similar to corresponding features of the first embodiment shown in FIGS. 1 and 3.

Figure 11:
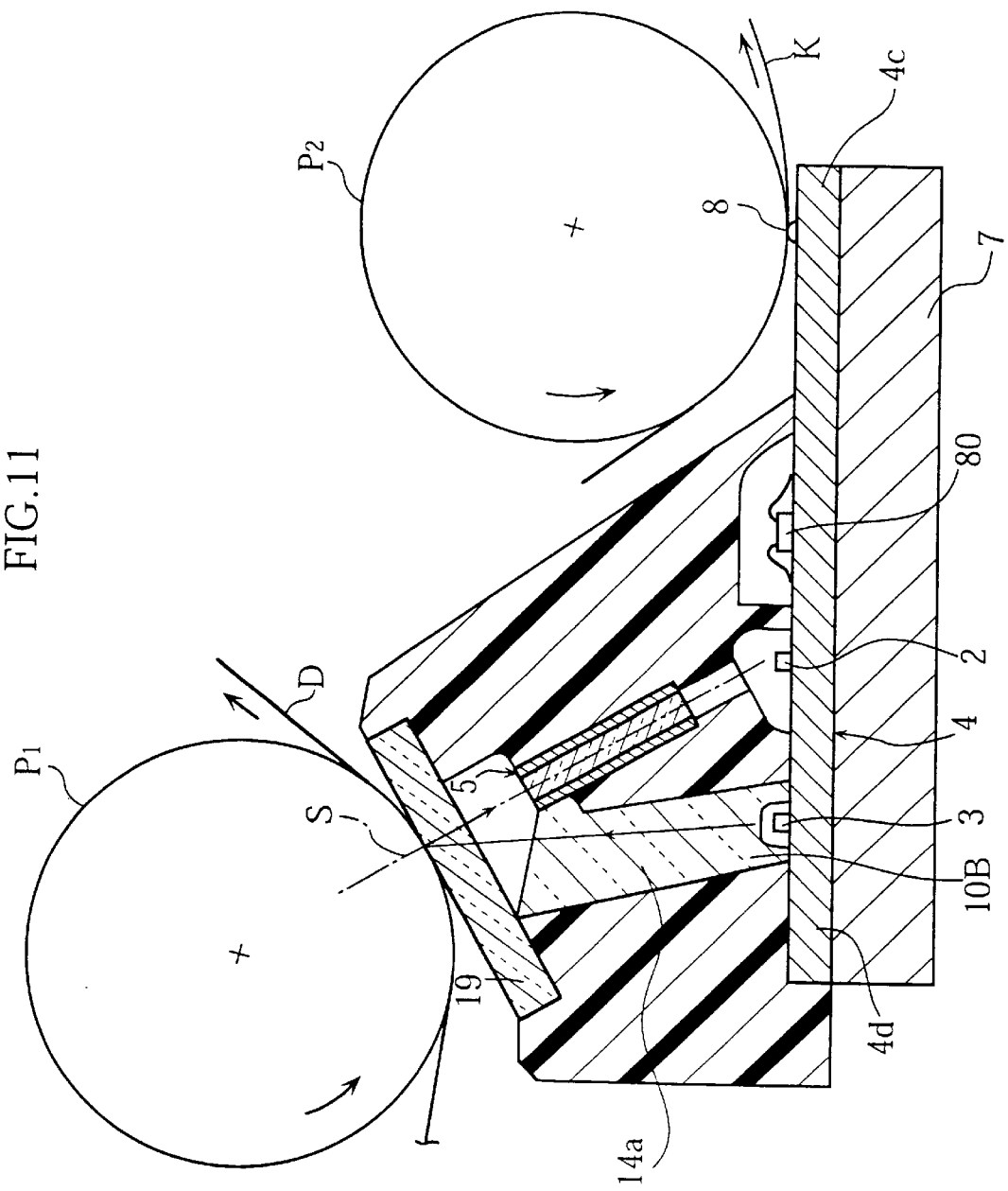
FIG. 11 is a sectional view showing a third embodiment of an image read/write head according to the present invention.

Further, though the foregoing embodiment is constructed to guide light from the light sources 3 disposed in the case 1 to the image-reading region S with the white-colored inner wall surfaces of the case 1 reflecting such light, the scope of the present invention, of course, encompasses an arrangement such that the case 1 accommodates, as the portion 14a of the case 1, a transparent light-conductive member 10B for guiding light emitted from the light sources 3 to the image-reading region S with a higher efficiency as in a third embodiment shown in FIG. 11. It is to be noted that other features of the third embodiment shown in FIG. 11 are similar to corresponding features of the first embodiment shown in FIGS. 1 and 3.

Figure 12:
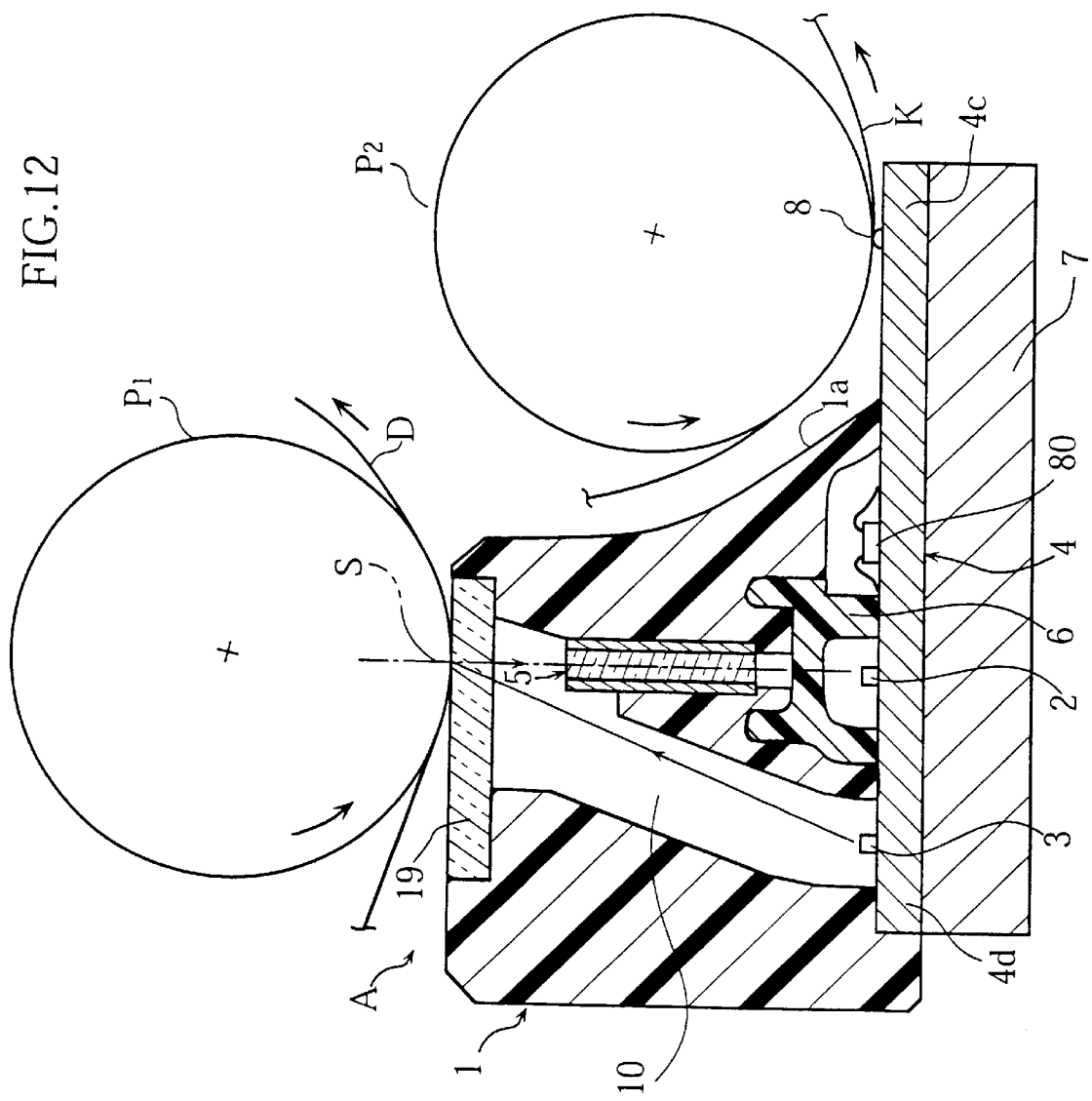
FIG. 12 is a sectional view showing a fourth embodiment of an image read/write head according to the present invention.

Even though the transparent cover 19 is positioned parallel to the substrate 4 as in a fourth embodiment shown in FIG. 12, a configuration such that the lateral surface 1a of the case 1 on the side closer to the first side portion 4c of the substrate 4 is tapered as shown can enjoy the advantage that a sufficient spacing is secured between the platen rollers P1 and P2 to avoid an interference between the feeding path of the document D and that of the recording paper K. This arrangement is also encompassed within the scope of the present invention.

Figure 13:
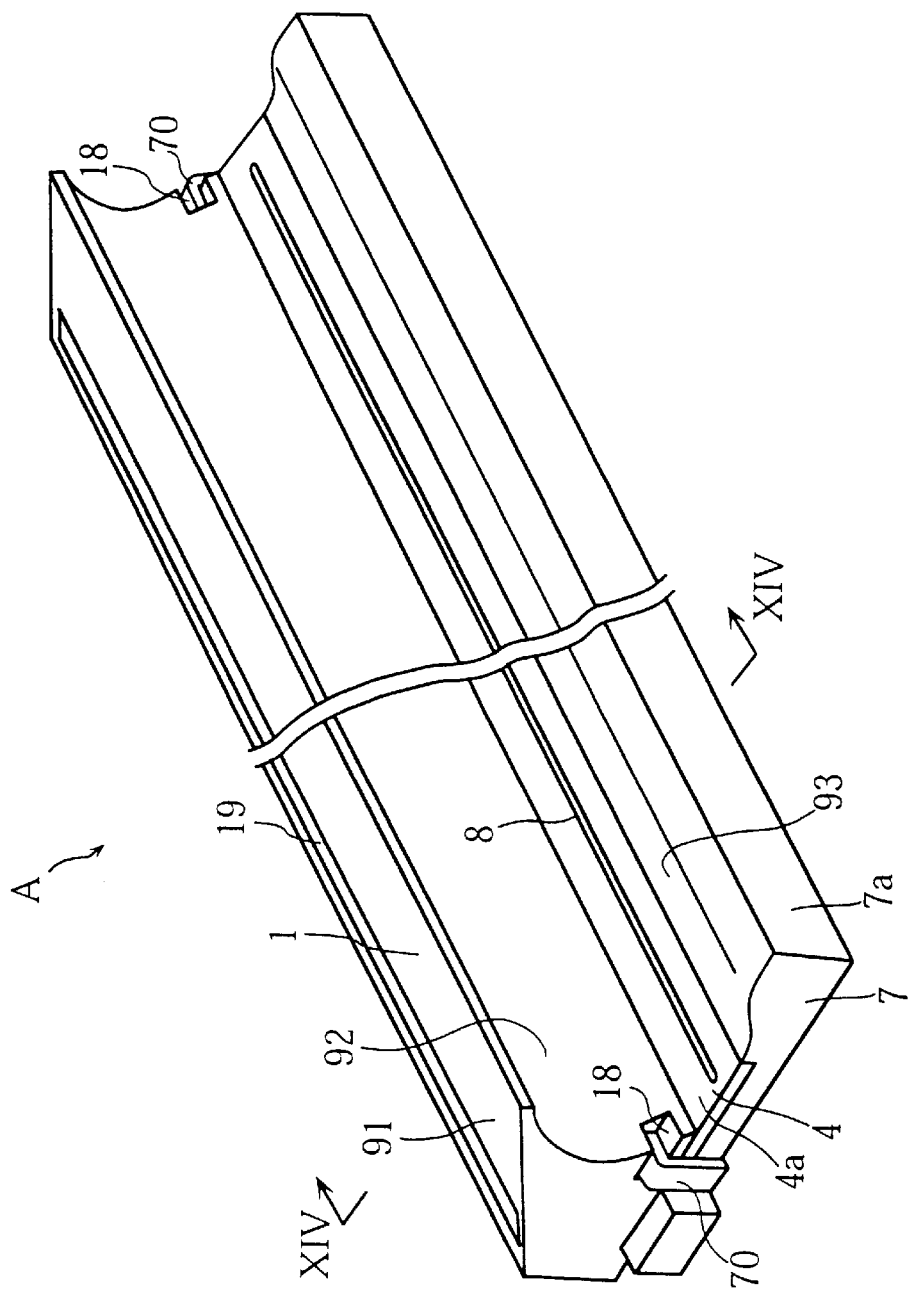
FIG. 13 is a sectional view showing a fifth embodiment of an image read/write head according to the present invention.
Figure 14:
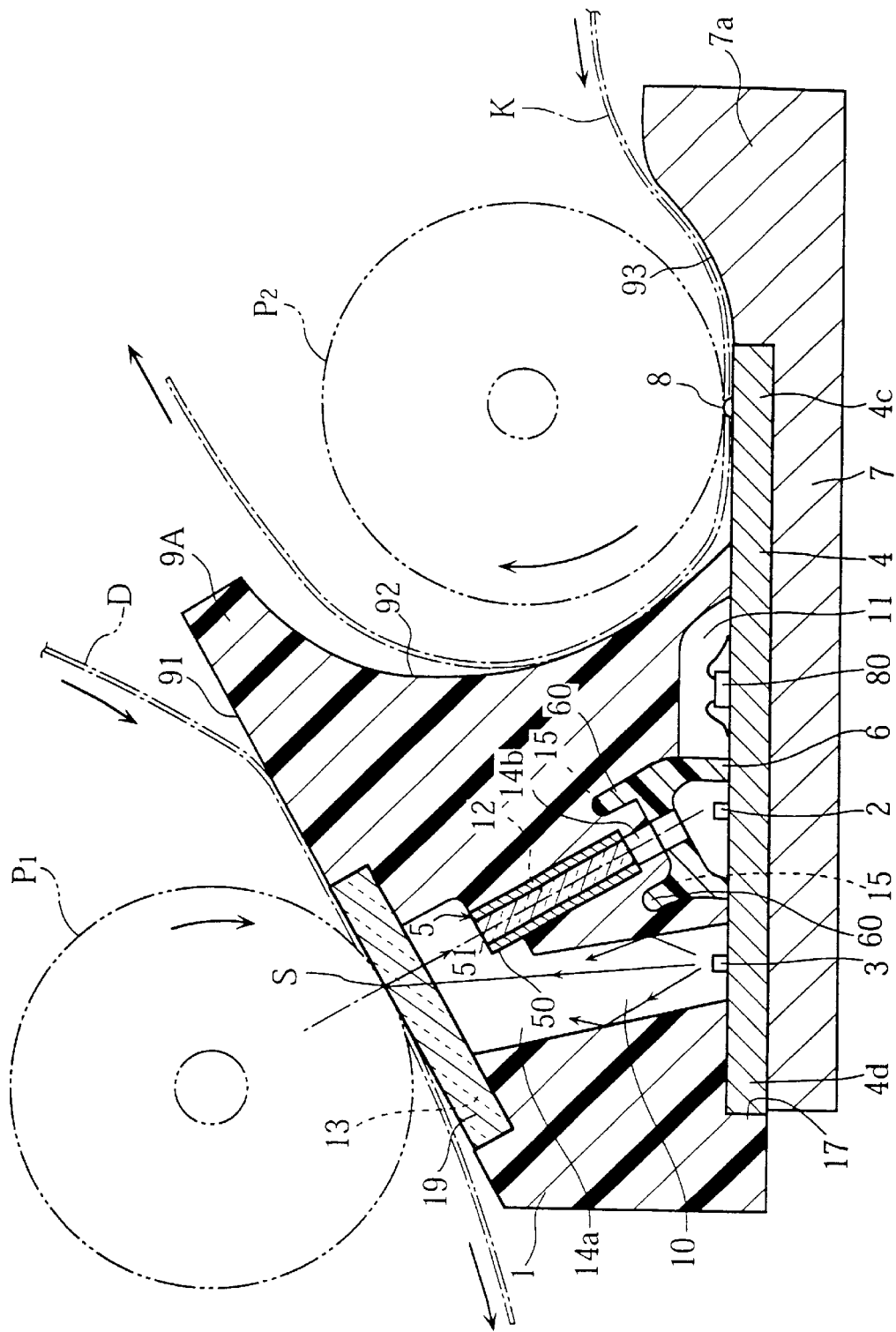
FIG. 14 is a sectional view taken along line XIV—XIV in FIG. 13.
Figure 15:
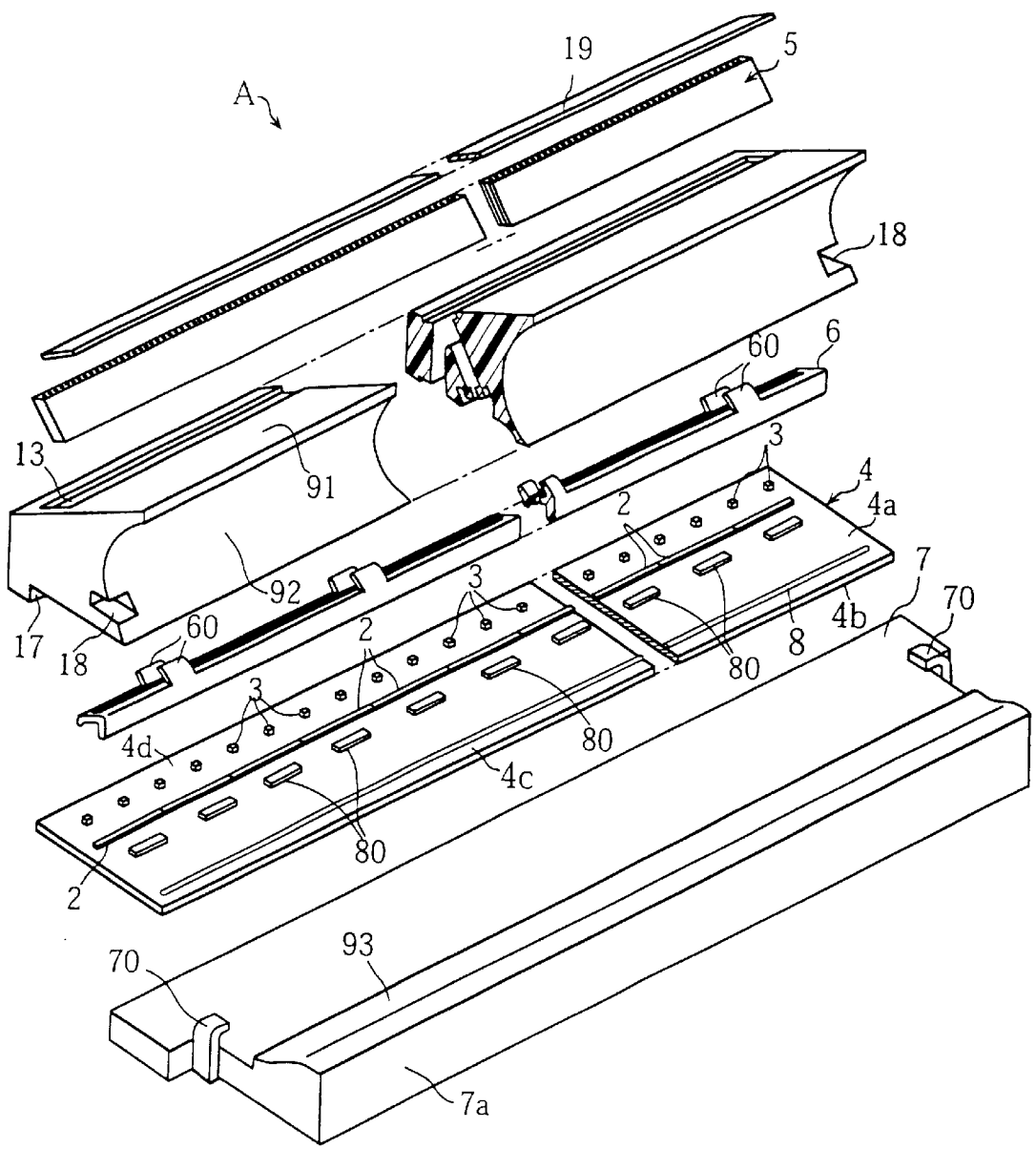
FIG. 15 is an exploded perspective view of the image read/write head shown in FIG. 13.

FIGS. 13 to 15 illustrate a fifth embodiment of an image read/write head according to the present invention. Since the fifth embodiment is different from the first embodiment in the outward forms of case 1 and heat sink plate 7 configured to define guide surfaces 91, 92 and 93 for guiding document D and/or recording paper K and other features of the fifth embodiment are similar to corresponding features of the first embodiment shown in FIGS. 1 and 3, the following description is directed to such different points only, and a detailed description of other features is omitted by giving like reference characters as used in the first embodiment to like or equivalent parts.

In the fifth embodiment also, the upper surface of the case 1 is inclined relative to the substrate 4 and, following this inclined upper surface, the transparent cover 19 is also inclined such that the cover 19 progressively lowers as it extends toward the second side portion 4d of the substrate 4.

The case 1 is formed at an upper portion thereof with a ridge 9A protruding toward the first side portion 4c. By the provision of the ridge 9A, the first and second guide surfaces 91 and 92 are defined on the case 1. The first guide surface 91 includes an upper surface of the ridge 9A and is a flat surface that is flush with the front surface of the transparent cover 19. The first guide surface 91 extends laterally outwardly of the transparent cover 19 continuously from one side edge of the transparent cover 19. The second guide surface 92, on the other hand, is a combined surface comprising a lower surface of the ridge 9A and one lateral surface of the case 1, the combined surface presenting a curved concave surface or a concave surface comprising a curved surface and a flat surface in combination and rises thicknesswise of the case 1 from a portion of the substrate 4 adjacent the region carrying the heat-generating elements 8.

The heat sink plate 7 bonded to reverse side 4b of the substrate 4 with a double-sided adhesive tape, an adhesive or the like is formed at a widthwise side edge portion thereof with an extra portion 7a outwardly extending beyond the first side portion 4c of the substrate 4, the extra portion 7a having a front surface defining the third guide surface 93. The third guide surface 93 comprises a curved surface or a flat surface, or a combination of a curved surface and a flat surface, and is inclined such that the height of the surface 93 decreases as the surface 93 comes closer to the first side portion 4c of the base plat 4. The third guide surface 93 is contiguous to the substrate 4 in a flushed fashion at the boundary therebetween.

Figure 16:
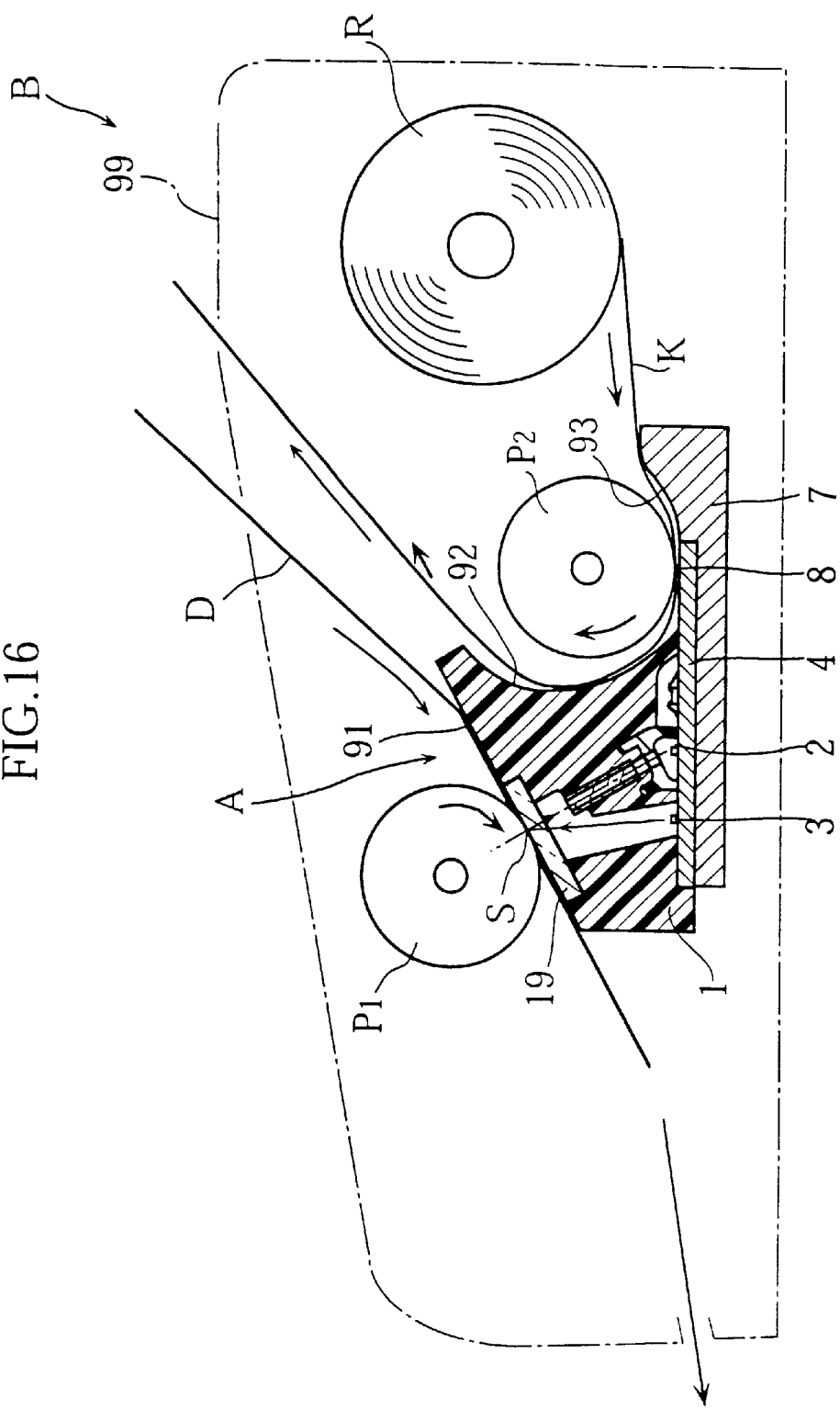
FIG. 16 is a schematic view illustrating the construction of an example of an image processing apparatus incorporating the image read/write head shown in FIG. 13.

FIG. 16 is a schematic view illustrating an example of an image processing apparatus B incorporating the image read/write head A described above.

The image processing apparatus B includes a rotatably driven platen roller P1 for feeding the document D at a location facing the transparent cover 19 on the upper surface of the case 4. The image processing apparatus B further includes a rotatably driven platen roller P2 for feeding the recording paper K at a location facing the heat-generating elements 8.

The image processing apparatus B has both the image-reading function and the image-forming function and is capable of reading the image of the document D and outputting the image as printed onto the recording paper K either separately or simultaneously. Further, the paper feeding in such operations can appropriately achieved. More specifically, when the document D is delivered onto the first guide surface 91, then the document D smoothly advances to a position between the front surface of the transparent cover 19 and the platen roller P1, so that the operation of reading the image on a surface of the document D is performed properly. On the other hand, when the recording paper K is delivered onto the third guide surface 93, then the recording paper K smoothly advances to a position between the heat-generating elements 8 and the platen roller P2, so that a desired image is outputted as printed onto a surface of the recording paper. When the recording paper K after having finished with printing moves along the second guide surface 92, the advancing direction of the recording paper K becomes substantially reverse to the direction in which the recording paper K is unrolled from the roll R. Accordingly, the recording paper K can smoothly advance toward a paper outlet located at an upper surface of a casing 99 without improper interference between the recording paper K and the document D. By thus utilizing the plurality of guide surfaces 91, 92 and 93 of the image read/write head A to guide the document and the recording paper K properly, it is possible to reduce the number of additional guide members (not shown) provided on the casing 99 for the purpose of guiding the paper feeding of the document D and the recording paper K, thus leading to easy manufacture of the image processing apparatus B.

Since the second guide surface 92 facing the platen roller P2 is concave in the image read/write head A, the platen roller P2 can be disposed considerably closely to the image read/write head A with an improved space-saving efficiency by positioning the platen roller P2 conformably to the second guide surface 92. Thus, this arrangement is more preferable in downsizing the whole apparatus. Further, since the transparent cover 19 is inclined, it is possible to position the platen roller P1 facing this transparent cover 19 at a location adequately spaced from the other platen roller P2. Thus, the image processing apparatus having such an arrangement can enjoy advantages similar to those described with respect to the first embodiment, including an advantage such that improper interference between the two platen rollers P1 and P2 can be avoided even when their respective diameters are increased.

Figure 17:
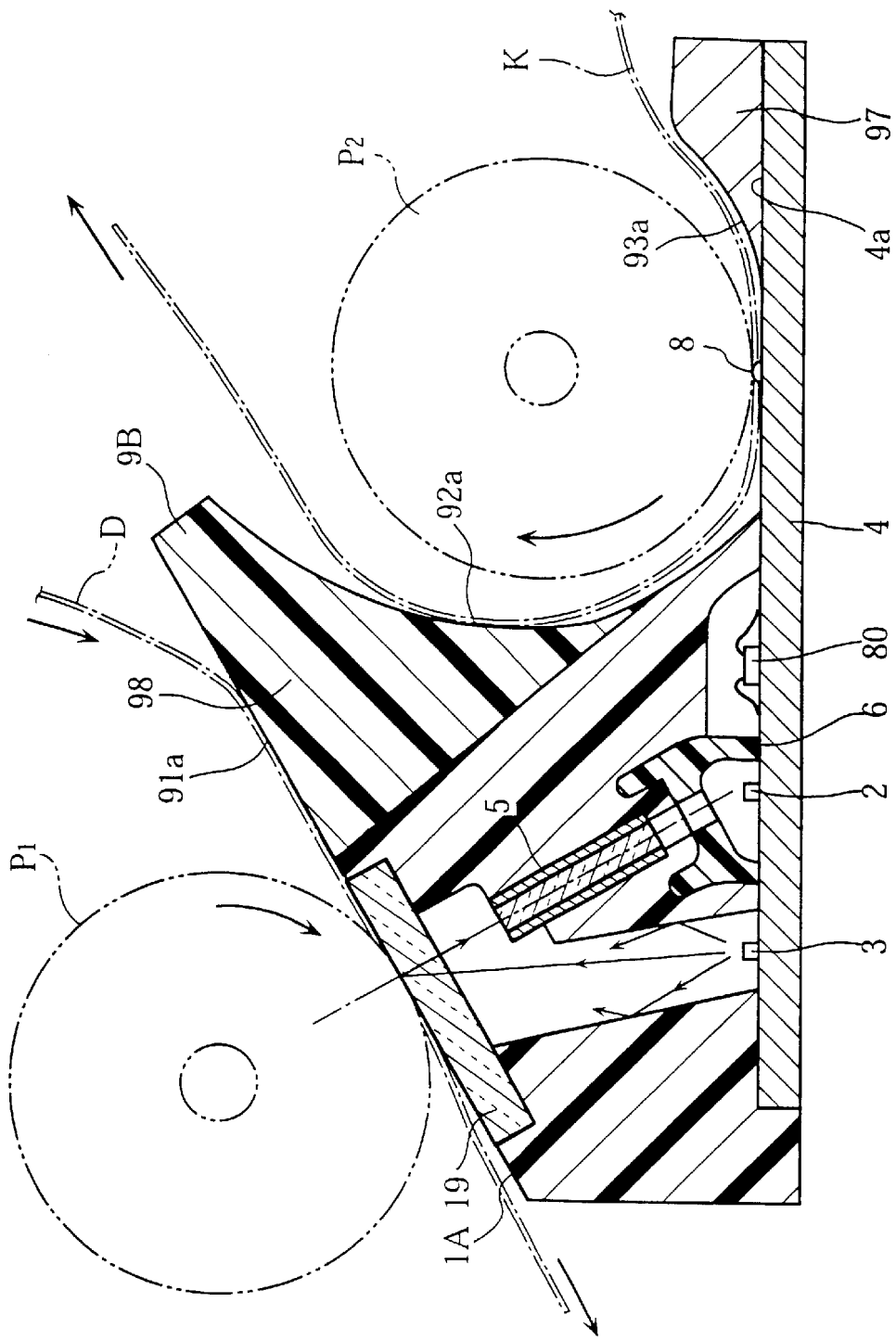
FIG. 17 is a sectional view showing a sixth embodiment of an image read/write head according to the present invention.

FIG. 17 illustrates a sixth embodiment of an image read/write head according to the present invention. In FIG. 17, like reference characters designate those parts equivalent to the corresponding parts of the foregoing embodiments. In the construction shown, a case 1A is provided with an auxiliary member 98 formed separately from the case 1A to form a ridge 9B. An upper surface of the ridge 9B defines a first guide surface 91a for guiding the document, while the other lateral surface of the ridge 9B together with part of a lateral surface of the case 1A defines a second guide surface 92a for guiding the recording paper K. The substrate 4 is provided at its front surface 4a with an auxiliary member 97 formed separately from the substrate 4, the auxiliary member 97 having a front surface defining a third guide surface 93a, for guiding the recording paper K. In this way, the present invention may use parts formed separately from essential parts forming the image read/write head to define any guide surface for transferring the document D or the recording paper K. Such a construction also can enjoy advantages similar to those described with respect to the fifth embodiment.

Figure 19:
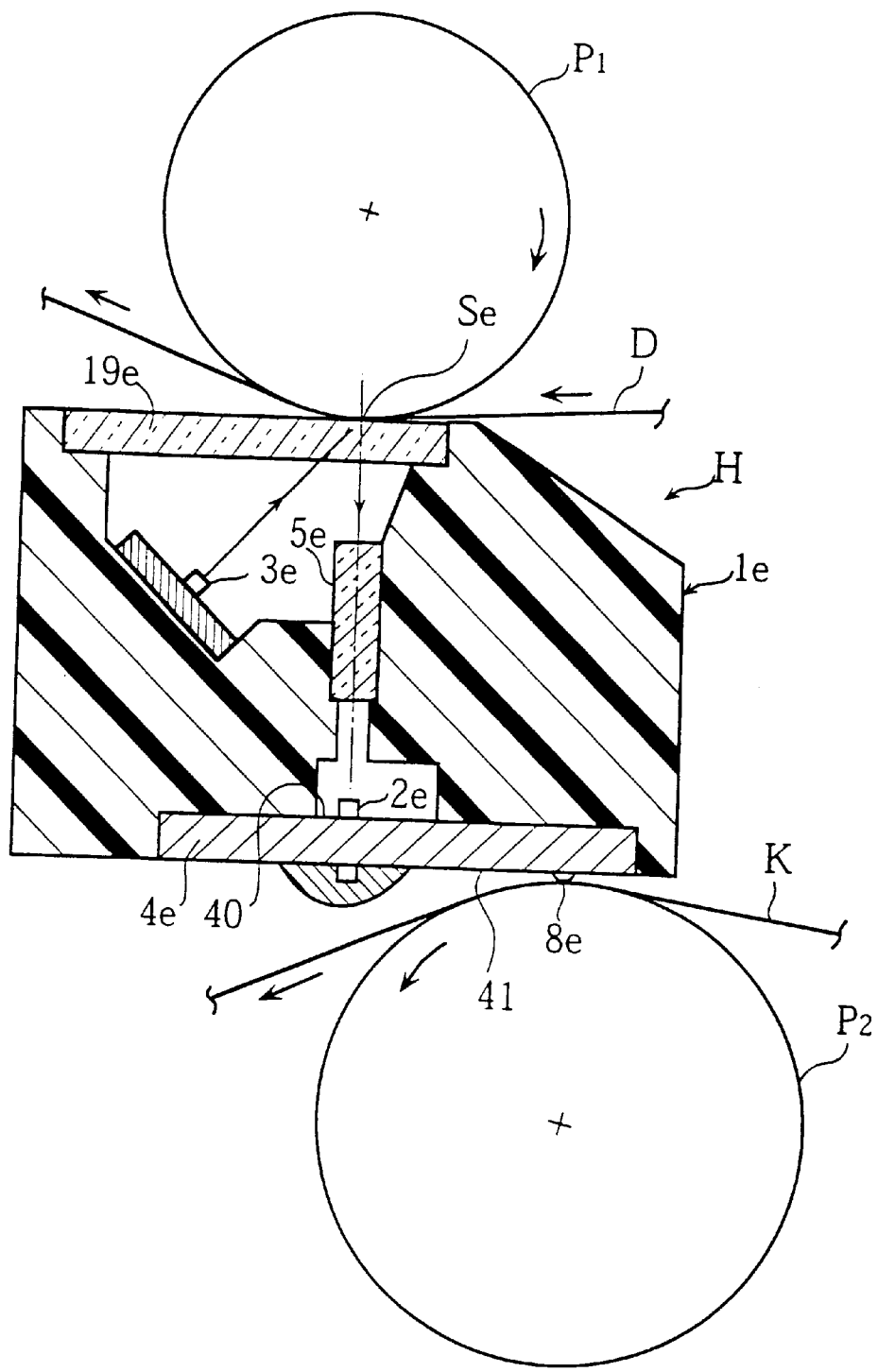
FIG. 19 is a view illustrating the prior art.

Each of the guide surfaces does not necessarily have a relatively large area as above. For example, a plurality of projecting members arranged with appropriate intervals in the primary scanning direction may serve the purpose. Further, though the light sources 3 are mounted on the same plane of the substrate 4 as are the light-receiving elements 2 and the heat-generating elements 8 in the foregoing embodiments, the present invention may replace such an arrangement with an arrangement having the light sources disposed in the case as in, for example, a prior art apparatus shown in FIG. 19.

Figure 18:
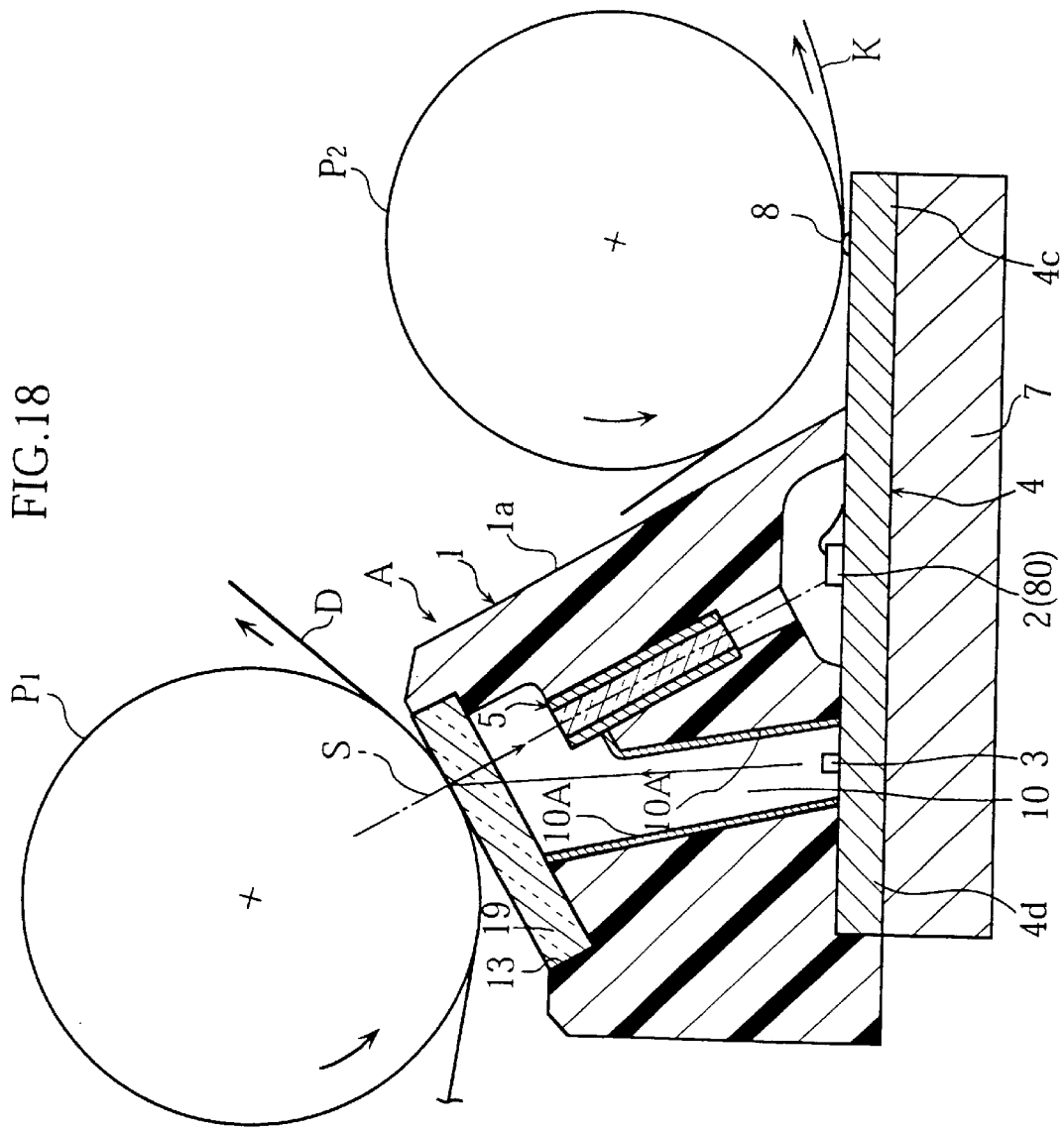
FIG. 18 is a sectional view showing a seventh embodiment of an image read/write head according to the present invention.

FIG. 18 illustrates a seventh embodiment of an image read/write head according to the present invention. In this embodiment, light-receiving element 2 and driving IC 80 for printing to be mounted on the substrate 4 are integrated into a chip. Use of such a chip facilitates the assemblage of the image read/write head while allowing the case to be wholly downsized by reducing the space defined by the lower portion of the case. Other features of the seventh embodiment shown in FIG. 18 are similar to the corresponding features of the second embodiment shown in FIG. 10.

It is apparent that various modifications may be made in the present invention without departing from the scope of the invention defined by the following claims. For example, the light sources 3 are not necessarily mounted on the substrate 4 carrying the sensor IC chips and the printing elements.

Further, the engagement means for assembling the substrate and the case together with ease may comprise engaging protrusions provided on the case and dented portions defined in the substrate or the heat sink plate for engagement therebetween.

What is claimed is:

1. An image read/write head comprising:
a substrate having a first widthwise side portion, a second widthwise side portion, and an upper surface carrying a row of light-receiving elements longitudinally of the substrate;
an elongate case mounted to the upper surface of the substrate to enclose the light-receiving elements;
a transparent cover mounted to an upper surface of the case for contact with a document to be fed;
a light source disposed in the case for illuminating the document;
a lens unit disposed within the case for causing an image of the document illuminated by the light source to be formed on the light-receiving elements; and
a row of printing elements carried by the upper surface of the substrate;
wherein the first side portion of the substrate has an excess portion extending beyond a lower edge of the case and located outside the case;
wherein the row of printing elements is located on the excess portion of the substrate outside the case; and
wherein the transparent cover is inclined such that the cover becomes progressively farther from the substrate as it extends toward the excess portion of the substrate.

2. The image read/write head according to claim 1, wherein the case and the substrate are assembled together by engagement means for bringing the substrate or a member integral with the substrate into engagement with the case.

3. The image read/write head according to claim 2, wherein the engagement means is configured to cause longitudinally opposite ends of the case to engage the substrate or a member attached on the substrate.

4. The image read/write head according to claim 3, wherein the engagement means is configured to cause a portion of the case adjacent the printing elements transversely of the case to engage the substrate or the member attached on the substrate.

5. The image read/write head according to claim 4, wherein the case has a bottom surface facing the substrate, the bottom surface having a longitudinally central portion bulging relative to longitudinally opposite ends thereof when the case is in a natural state.

6. The image read/write head according to claim 5, wherein the member attached on the substrate is a heat sink plate.

7. The image read/write head according to claim 6, wherein the engagement means comprises an engaging protrusion provided on the heat sink plate for engaging the case.

8. The image read/write head according to claim 6, wherein the case, the substrate and the heat sink plate are made of respective materials having respective linear expansion coefficients in proximity to each other.

9. The image read/write head according to claim 1, further comprising a single or plural guide means provided integrally with or separately from the case, the substrate or a member integral therewith for guiding feed of at least one of the document to be delivered to a front surface of the transparent cover and the recording paper to be delivered to a region of the substrate carrying the printing elements.

10. The image read/write head according to claim 9, wherein the case is provided with a first guide surface extending outwardly from one side edge of the front surface of the transparent cover, the first guide surface being defined by a ridge protruding toward the first side portion of the substrate, and a concave second guide surface rising thicknesswise of the case from a portion adjacent the printing element carrying region of the substrate, the first and second guide surfaces forming the guide means.

11. The image read/write head according to claim 10, further comprising a heat sink plate superposed on a reverse side of the substrate, wherein the printing elements are heat-generating elements.

12. The image read/write head according to claim 11, wherein the heat sink plate has an extra portion extending beyond the excess portion of the substrate, the extra portion defining a third guide surface continuous with a portion of the substrate adjacent the printing element carrying region of the substrate.

13. The image read/write head according to claim 1, wherein the case has inner wall surfaces defining an internal space of the case, at least part of the inner wall surfaces serving as a reflective surface which is rendered white to provide a high light-reflectivity.

14. The image read/write head according to claim 13, wherein the case is formed of a white-colored resin and has a chamber for accommodating the light-receiving elements, the chamber being provided with reflection-preventive means covering inner wall surfaces of the chamber to enclose the row of the light-receiving elements, the reflection-preventive means including a light-absorptive surface having a lower light-reflectivity than the inner wall surfaces of the chamber.

15. The image read/write head according to claim 14, wherein the light-absorptive surface is formed of a black-colored member fitted in the chamber.

16. The image read/write head according to claim 14, wherein the light-absorptive surface is formed of a black-colored coating applied on the inner wall surfaces of the chamber, or a black-colored sheet or film bonded to the inner wall surfaces of the chamber.

17. An image processing apparatus comprising an image read/write head as recited in claim 1.

18. An image read/write head comprising:
a substrate having a first widthwise side portion, a second widthwise side portion, and an upper surface carrying a row of light-receiving elements longitudinally of the substrate;
an elongate case mounted to the upper surface of the substrate to enclose the light-receiving elements;
a transparent cover mounted to an upper surface of the case for contact with a document to be fed;
a light source disposed in the case for illuminating the document;
a lens unit disposed in the case for causing an image of the document illuminated by the light source to be formed on the light-receiving elements; and
a row of printing elements carried by the upper surface of the substrate;
wherein the first side portion of the substrate has an excess portion extending beyond a lower edge of the case and located outside the case;
wherein the row of printing elements is located on the excess portion of the substrate outside the case; and
wherein the lens unit is inclined toward the second side portion as the lens unit extends away from the substrate.

19. The image read/write head according to claim 18, wherein the light-receiving elements provide a row of light-receiving faces extending in a primary scanning direction, each of the light-receiving faces having a secondary scanning direction width which is larger than a pitch between the light-receiving faces in the primary scanning direction.

20. The image read/write head according to claim 19, wherein the secondary scanning direction width L of each light-receiving face meets $L \leq p \cdot \sec \theta$, where p is the pitch between the light-receiving faces, and $\theta$ is an angle of inclination of the lens unit relative to a line normal to the light-receiving face.

21. The image read/write head according to claim 18, wherein the light-receiving elements each include a light-receiving face having a secondary scanning direction width L which meets $L < p' \cdot m$, where p' is a minimum image-reading pitch in the secondary scanning direction, and m is an image magnification of the lens.

22. An image read/write head comprising:

a substrate having a first widthwise side portion, a second widthwise side portion, and an upper surface carrying a row of light-receiving elements longitudinally of the substrate;

an elongate case mounted to the upper surface of the substrate to enclose the light-receiving elements;

a transparent cover mounted to an upper surface of the case for contact with a document to be fed;

a light source disposed in the case for illuminating the document;

a lens unit disposed in the case for causing an image of the document illuminated by the light source to be formed on the light-receiving elements; and a row of printing elements carried by the upper surface of the substrate;

wherein the first side portion of the substrate has an excess portion extending beyond a lower edge of the case and located outside the case;

wherein the row of printing elements is located on the excess portion of the substrate outside the case; and wherein the case has a lateral surface on a side closer to the excess portion of the substrate, the lateral surface being inclined toward the second side portion of the substrate as the lateral surface extends away from the substrate.

* * * * *